US012072667B2

(12) United States Patent
Harada et al.

(10) Patent No.: US 12,072,667 B2
(45) Date of Patent: Aug. 27, 2024

(54) CARTRIDGE AND IMAGE FORMING APPARATUS

(71) Applicant: CANON KABUSHIKI KAISHA, Tokyo (JP)

(72) Inventors: Yuko Harada, Kanagawa (JP); Ryuta Murakami, Shizuoka (JP); Masakazu Tatsumi, Meridian, ID (US); Akira Yoshimura, Shizuoka (JP); Satoshi Koga, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/207,190

(22) Filed: Jun. 8, 2023

(65) Prior Publication Data

US 2023/0418213 A1 Dec. 28, 2023

(30) Foreign Application Priority Data

Jun. 24, 2022 (JP) ................................ 2022-102264

(51) Int. Cl.
*G03G 15/10* (2006.01)
*G03G 21/18* (2006.01)
*G03G 15/08* (2006.01)

(52) U.S. Cl.
CPC ..... *G03G 21/1814* (2013.01); *G03G 21/1832* (2013.01); *G03G 15/0862* (2013.01)

(58) Field of Classification Search
CPC ........... G03G 15/0856; G03G 15/0862; G03G 21/1814; G03G 21/1832
USPC ...................................................... 399/61, 64
See application file for complete search history.

(56) References Cited

U.S. PATENT DOCUMENTS

| | | | |
|---|---|---|---|
| 6,987,938 B2 | 1/2006 | Murakami et al. |
| 7,024,131 B2 | 4/2006 | Komatsu et al. |
| 7,156,797 B2 | 1/2007 | Komatsu et al. |
| 7,206,534 B2 | 4/2007 | Murakami |

(Continued)

FOREIGN PATENT DOCUMENTS

| | | |
|---|---|---|
| JP | 2003-167490 A | 6/2003 |
| JP | 2004-301896 A | 10/2004 |

(Continued)

OTHER PUBLICATIONS

Co-pending U.S. Appl. No. 18/207,736, filed Jun. 9, 2023.

(Continued)

*Primary Examiner* — Hoang X Ngo
(74) *Attorney, Agent, or Firm* — Venable LLP

(57) ABSTRACT

A cartridge includes a container, a light guide including incident and emergent portions, and a cover including outer and inner surfaces. When a direction directing from the outer surface toward the inner surface is a first direction, and a direction in which the incident and emergent portions are arranged is a second direction, (i) the outer surface is recessed toward a downstream side of the first direction between the incident and emergent portions, (ii) a first end of a bottom of the recessed portion on an incident portion side is positioned on a side downstream with respect to the first direction, of a second end of the bottom on an emergent portion side, and (iii) the bottom is curved so as to be recessed toward the downstream side of the first direction between the first and second ends relative to an imaginary rectilinear line connecting these ends.

14 Claims, 23 Drawing Sheets

(56) References Cited

U.S. PATENT DOCUMENTS 7,460,799 B2 * 12/2008 Yamaguchi ........ G03G 15/0856 399/27
7,509,071 B2 3/2009 Yoshimura et al.
7,751,728 B2 * 7/2010 Okabe ................ G03G 15/0889 399/27
7,778,570 B2 8/2010 Numagami et al.
7,860,433 B2 12/2010 Toba et al.
7,869,740 B2 1/2011 Yoshimura et al.
8,150,293 B2 4/2012 Numagami et al.
8,165,494 B2 4/2012 Yoshimura et al.
8,213,831 B2 7/2012 Toba et al.
8,369,743 B2 2/2013 Maeshima et al.
8,417,144 B2 4/2013 Numagami et al.
8,588,646 B2 11/2013 Yoshimura et al.
8,620,181 B2 12/2013 Murakami
8,712,284 B2 4/2014 Toba et al.
8,971,760 B2 3/2015 Yoshimura et al.
9,052,638 B2 6/2015 Matsumaru et al.
9,069,289 B2 6/2015 Batori et al.
9,116,466 B2 8/2015 Makiguchi et al.
9,122,237 B2 9/2015 Maeshima et al.
9,141,083 B2 9/2015 Yoshimura et al.
9,164,430 B2 10/2015 Murakami et al.
9,188,906 B2 11/2015 Batori et al.
9,429,906 B2 8/2016 Yoshimura et al.
9,465,318 B2 10/2016 Takeuchi et al.
9,494,916 B2 11/2016 Yoshimura et al.
9,501,034 B2 11/2016 Yoshimura et al.
9,507,318 B2 11/2016 Maeshima et al.
9,519,260 B2 12/2016 Yoshimura et al.
9,523,942 B2 12/2016 Takeuchi et al.
9,599,932 B2 3/2017 Takeuchi et al.
9,829,856 B2 11/2017 Yoshimura et al.
9,836,020 B2 12/2017 Yoshimura et al.
9,857,763 B2 1/2018 Yoshimura et al.
9,989,892 B2 6/2018 Takeuchi et al.
10,095,161 B2 10/2018 Takeuchi et al.
10,162,304 B2 12/2018 Yoshimura et al.
10,168,664 B2 1/2019 Yoshimura et al.
10,234,820 B2 3/2019 Yoshimura et al.
10,401,788 B2 9/2019 Yoshimura et al.
10,591,868 B2 3/2020 Yoshimura et al.
10,627,780 B2 4/2020 Fujiwara et al.
10,642,218 B2 5/2020 Yoshimura et al.
10,678,184 B2 6/2020 Murakami et al.
10,732,545 B2 8/2020 Takeuchi et al.
10,761,478 B2 9/2020 Yoshimura et al.
10,901,366 B2 1/2021 Murakami et al.
10,962,927 B2 3/2021 Fujiwara et al.
10,976,696 B2 4/2021 Yoshimura et al.
11,156,954 B2 10/2021 Yoshimura et al.
11,169,483 B2 11/2021 Murakami et al.
11,215,949 B2 1/2022 Yoshimura et al.
11,392,081 B2 7/2022 Murakami et al.
11,402,798 B2 8/2022 Murakami et al.
11,449,001 B2 9/2022 Fujiwara et al.
11,460,802 B2 10/2022 Yoshimura et al.
11,579,563 B2 2/2023 Yoshimura et al.
11,599,058 B2 3/2023 Yoshimura et al.
11,703,794 B2 7/2023 Matsumaru et al.
11,720,055 B2 8/2023 Murakami et al.
11,754,970 B2 9/2023 Yoshimura et al.
2009/0297175 A1 12/2009 Kakuta et al.
2017/0308003 A1 * 10/2017 Isoda ................. G03G 15/0862
2020/0301352 A1 9/2020 Matsumaru et al.
2022/0082984 A1 3/2022 Fujiwara et al.
2023/0032591 A1 2/2023 Murakami et al.
2023/0110629 A1 4/2023 Yoshimura et al.
2023/0195032 A1 6/2023 Murakami et al.
2023/0229108 A1 6/2023 Matsumaru et al.

FOREIGN PATENT DOCUMENTS

JP 2005-266068 A 9/2005
JP 2009-288304 A 12/2009
JP 2015-175943 A 10/2015

OTHER PUBLICATIONS

Co-pending U.S. Appl. No. 18/212,241, filed Jun. 21, 2023.
Co-pending U.S. Appl. No. 18/212,783, filed Jun. 22, 2023.
Co-pending U.S. Appl. No. 18/226,362, filed Jun. 26, 2023.
Co-pending U.S. Appl. No. 18/237,469, filed Aug. 24, 2023.

* cited by examiner

CARTRIDGE AND IMAGE FORMING APPARATUS

FIELD OF THE INVENTION AND RELATED ART

The present invention relates to a cartridge mountable in a main assembly of an image forming apparatus and to the image forming apparatus for forming an image on a recording material.

In an image forming apparatus of an electrophotographic type, a cartridge which is prepared by integrally assembling an image bearing member such as a photosensitive drum and process means, such as a developing roller, actable on the image bearing member into a unit and which is mounted in and demounted from an apparatus main assembly of the image forming apparatus is used. In Japanese Laid-Open Patent Application Nos. 2003-167490 and 2009-288304, a constitution in which a light guiding member is mounted on a developing container of a process cartridge and light is guided so that the light emitted from a light emitting element of the apparatus main assembly reaches a light receiving element of the apparatus main assembly through an inside space of the developing container and in which an amount of a developer in the developing container is capable of being detect has been disclosed.

SUMMARY OF THE INVENTION

According to an aspect of the present invention, there is provided a cartridge comprising: a container configured to accommodate a developer; a light guide including an incident portion and an emergent portion, wherein the incident portion has a columnar shape with a center line as a center and guides light so that the light enters from an outside of the cartridge into an inside of the container, and the emergent portion guides the light so that the light entered the inside of the container through the incident portion emerges toward the outside of the cartridge; and a cover configured to partially cover the light guide and including an outer surface facing the outside of the cartridge, an inner surface on a side opposite from the outer surface, a first opening through which an incident surface of the incident portion is exposed to the outside of the cartridge, and a second opening through which an emergent surface of the emergent portion is exposed to the outside of the cartridge, wherein when a direction which is a direction of the center line and which directs from an outer surface side toward an inner surface side of the cover is a first direction, a direction which crosses the first direction and in which the incident portion and the emergent portion are arranged is a second direction, and a direction crossing both the first direction and the second direction is a third direction, in a cross section perpendicular to the third direction, (i) the outer surface includes a recessed portion recessed toward a downstream side of the first direction between the incident portion and the emergent portion with respect to the second direction, (ii) a first end of a bottom of the recessed portion on an incident portion side with respect to the second direction is positioned on a side downstream with respect to the first direction, of a second end of the bottom on an emergent portion side with respect to the second direction, and (iii) the bottom is curved so as to be recessed toward the downstream side of the first direction between the first end and the second end relative to an imaginary rectilinear line connecting the first end and the second end.

Further features of the present invention will become apparent from the following description of exemplary embodiments with reference to the attached drawings.

Figure 9:
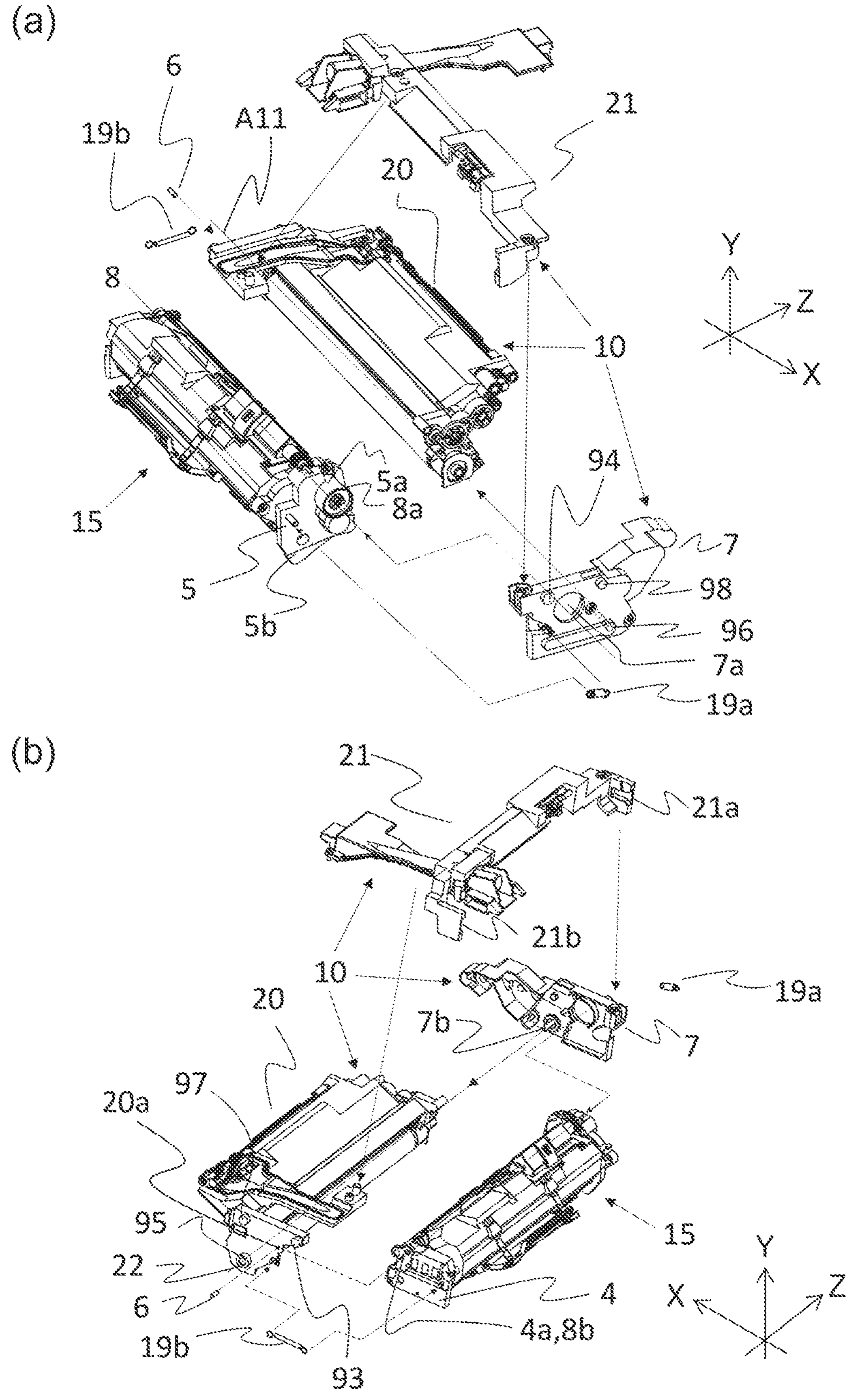

Parts (a) and (b) of FIG. 9 are exploded views of the process cartridge according to the embodiment.

Figure 10:
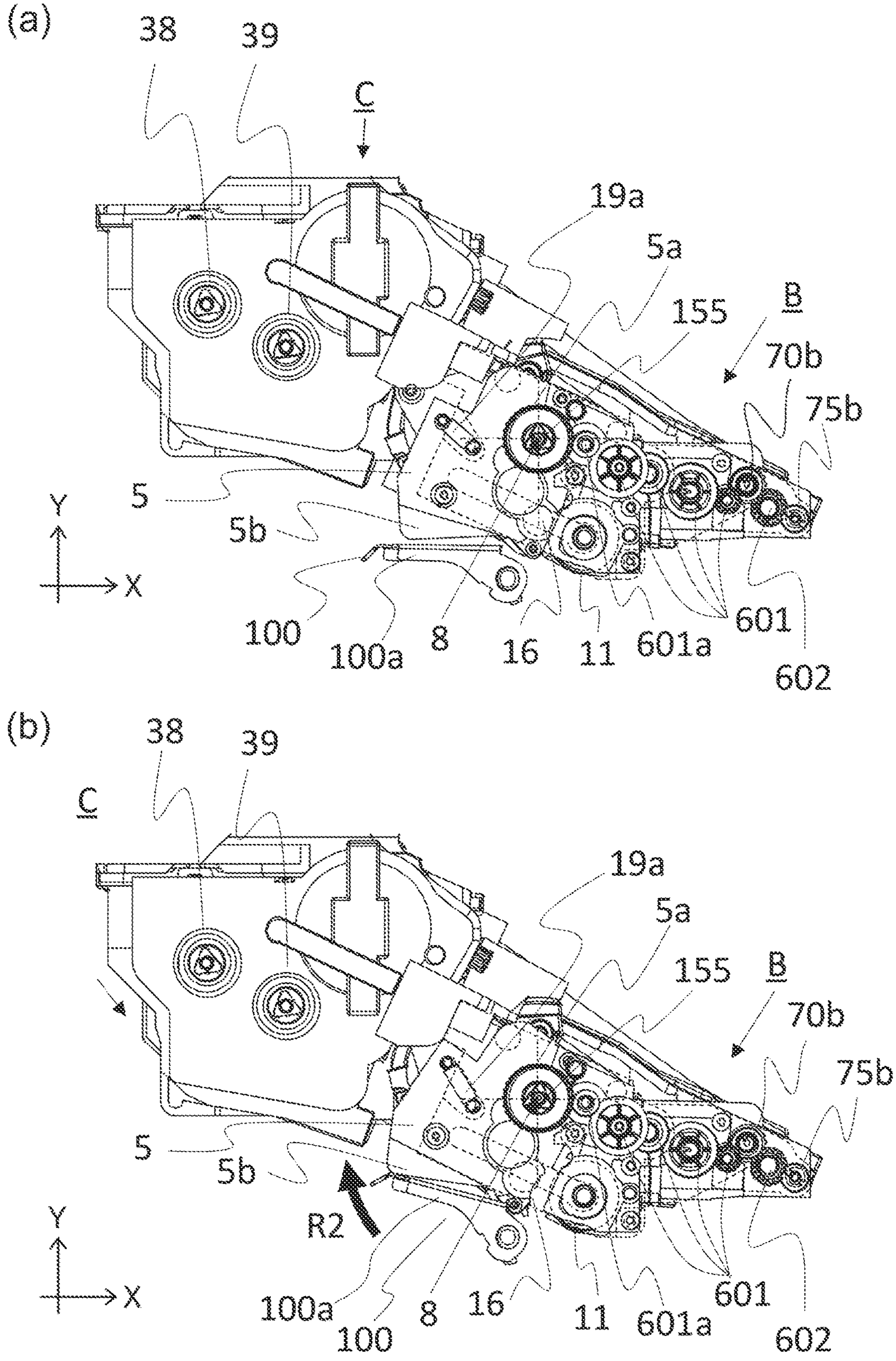

Parts (a) and (b) of FIG. 10 are side views for illustrating mounting of the process cartridge and the toner container according to the embodiment into an apparatus main assembly.

Figure 11:
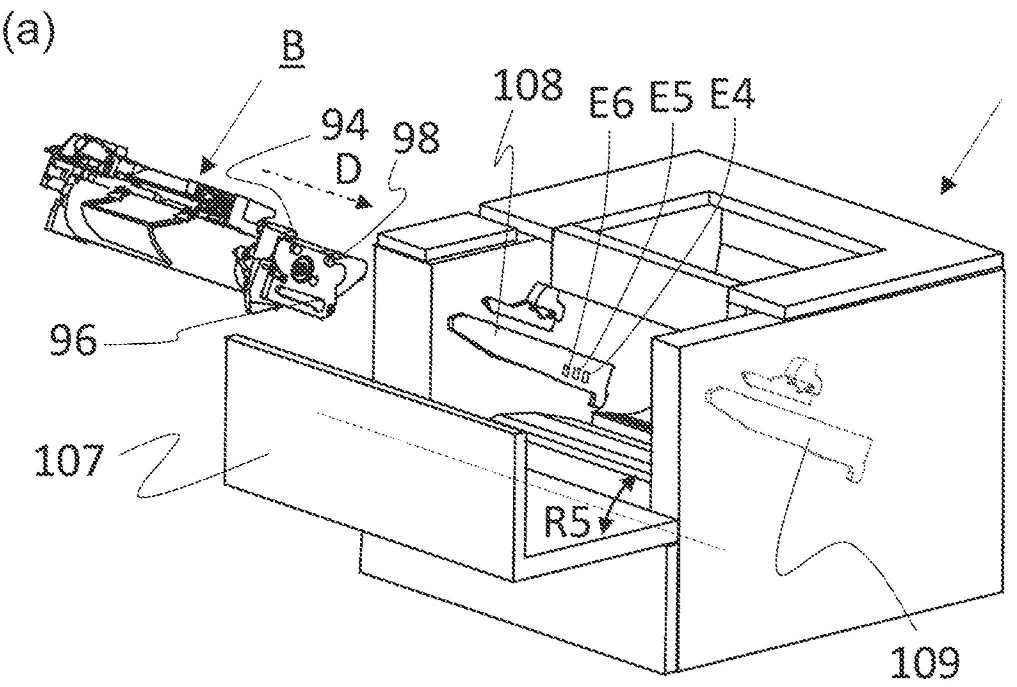
Figure 11:
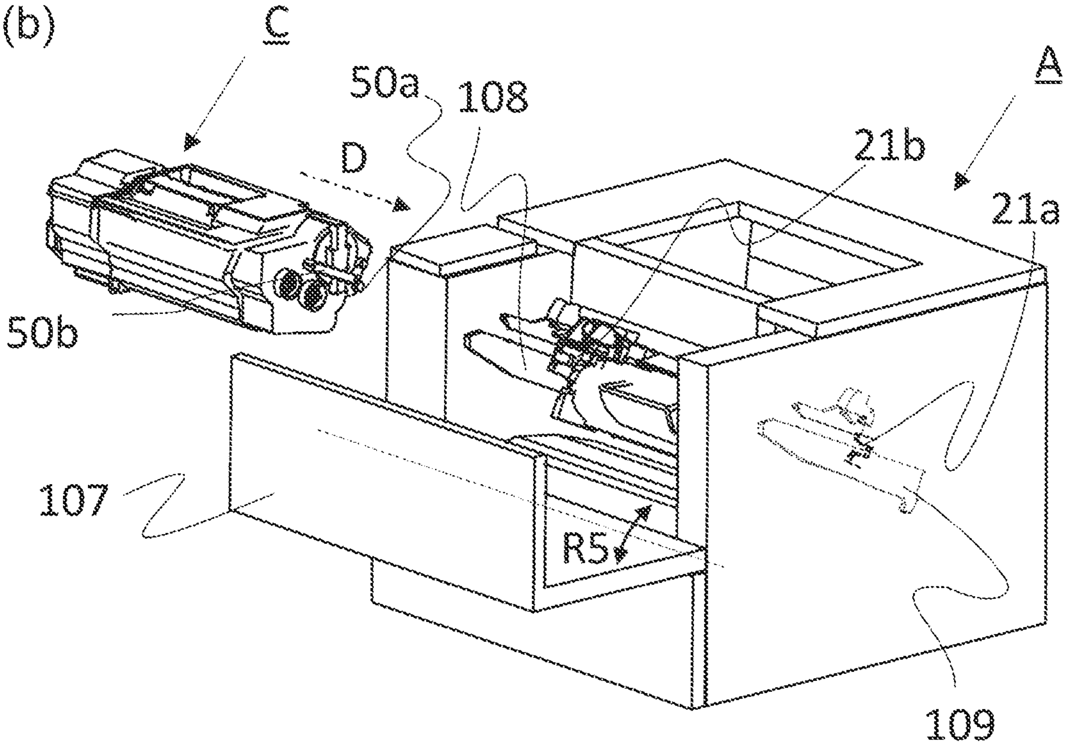

Parts (a) and (b) of FIG. 11 are perspective views for illustrating mounting of the process cartridge and the toner container according to the embodiment into the apparatus main assembly.

Figure 12:
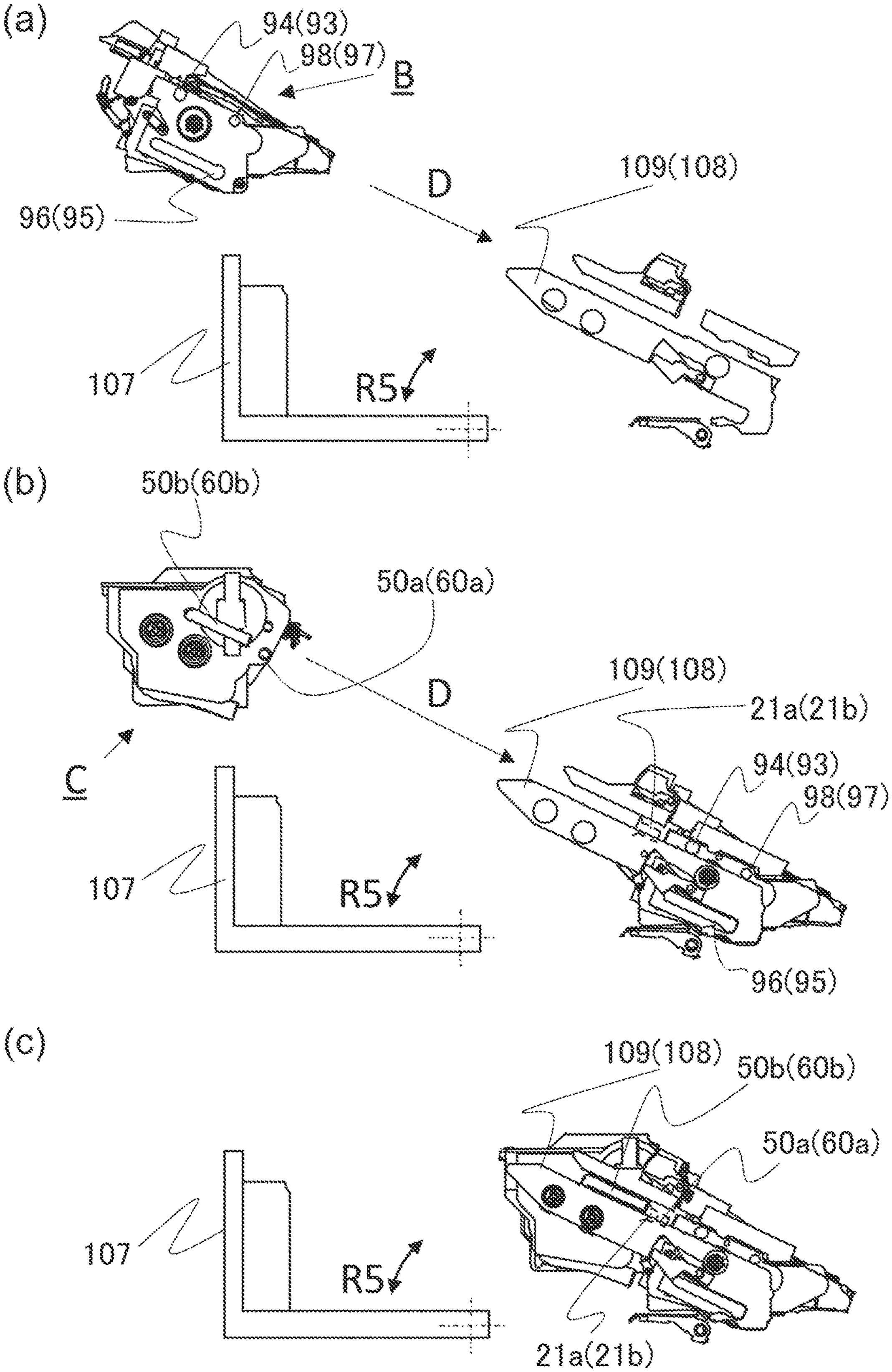

Parts (a) to (c) of FIG. 12 are side views for illustrating mounting of the process cartridge and the toner container according to the embodiment into the apparatus main assembly.

Figure 13:
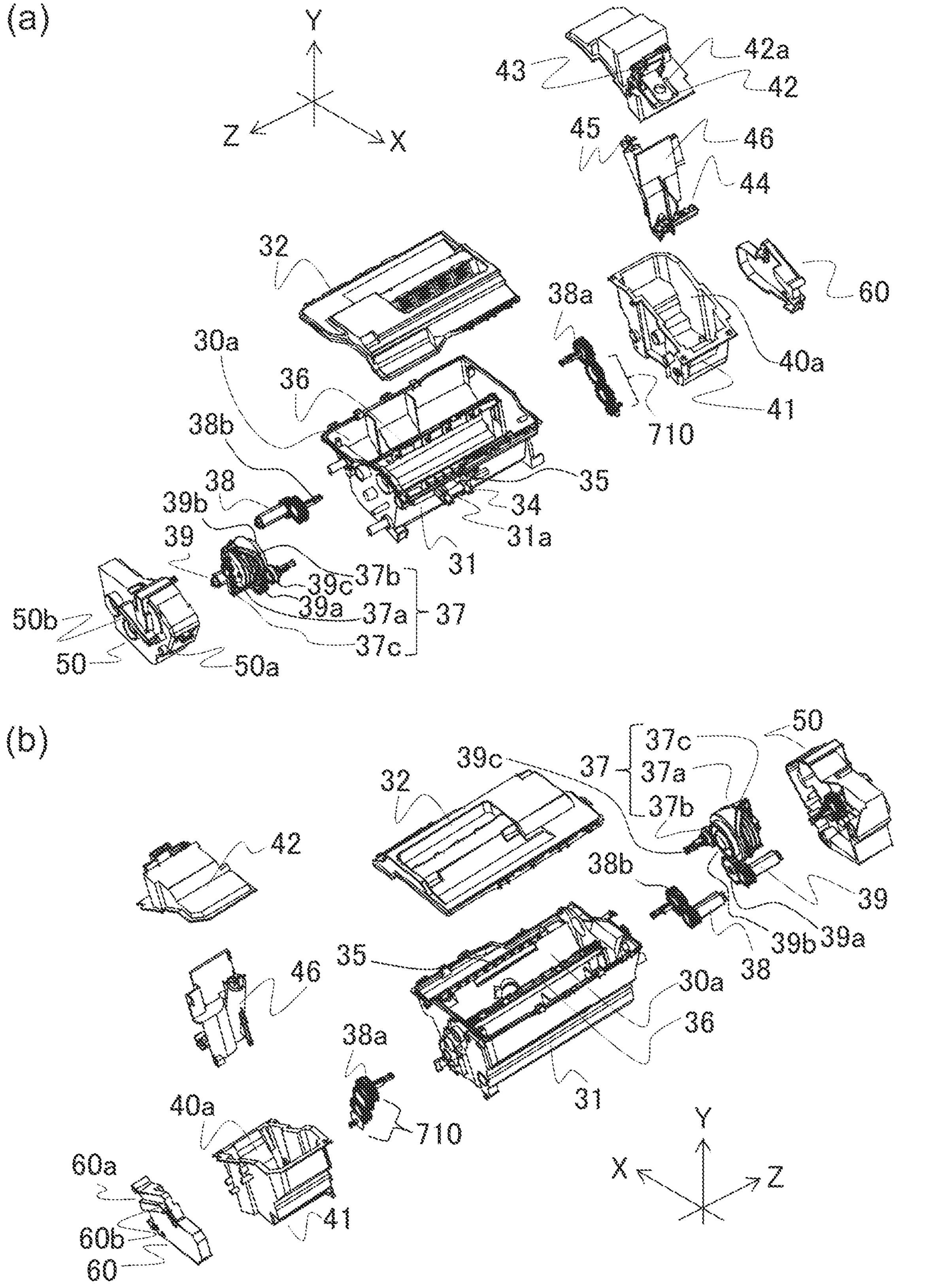

Parts (a) and (b) of FIG. 13 are exploded views of the toner container according to the embodiment.

Figure 14:
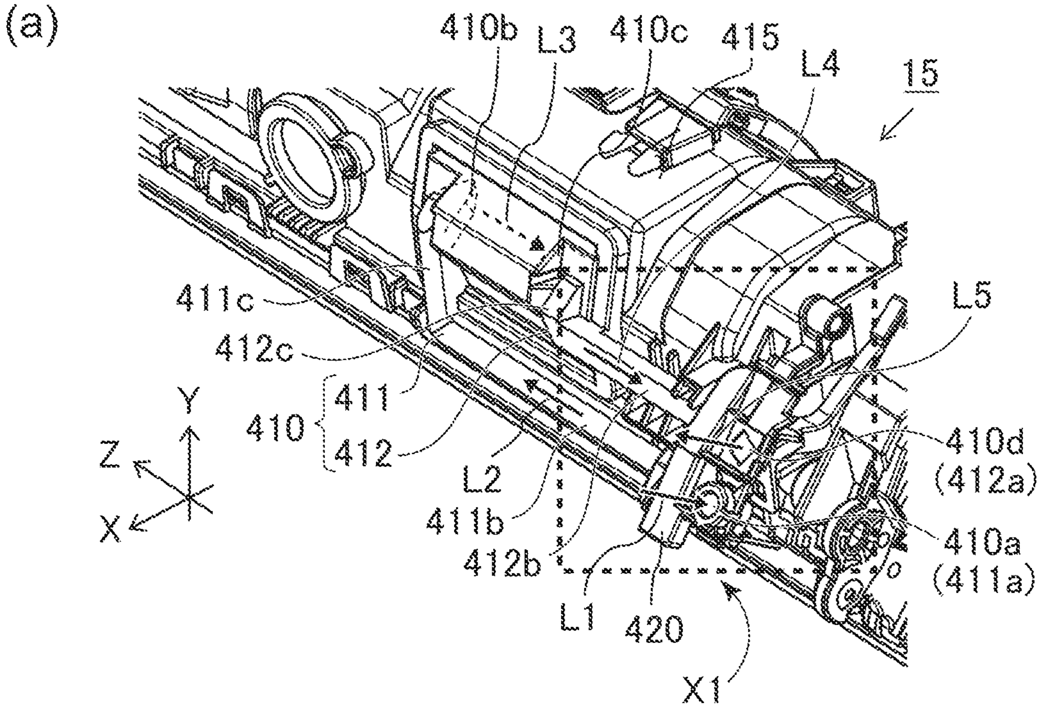
Figure 14:
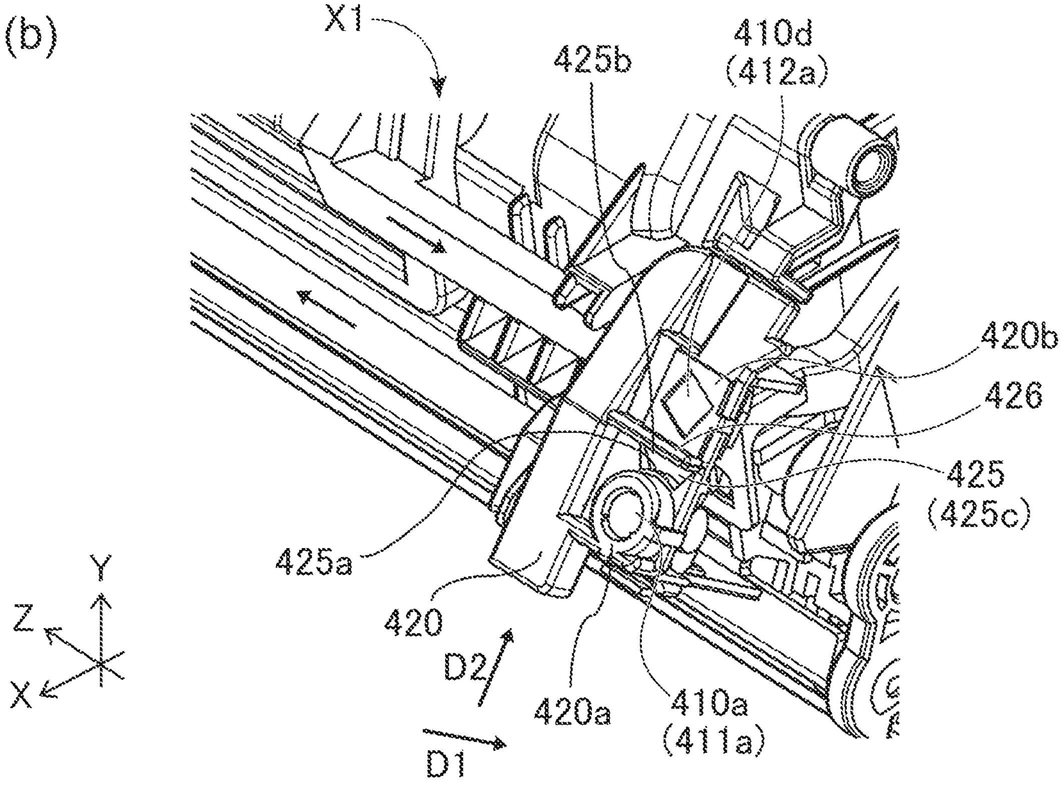

Part (a) of FIG. 14 is a perspective view showing a part of developing unit according to the embodiment, and part (b) of FIG. 14 is an enlarged view of the part of the developing unit.

Figure 15:
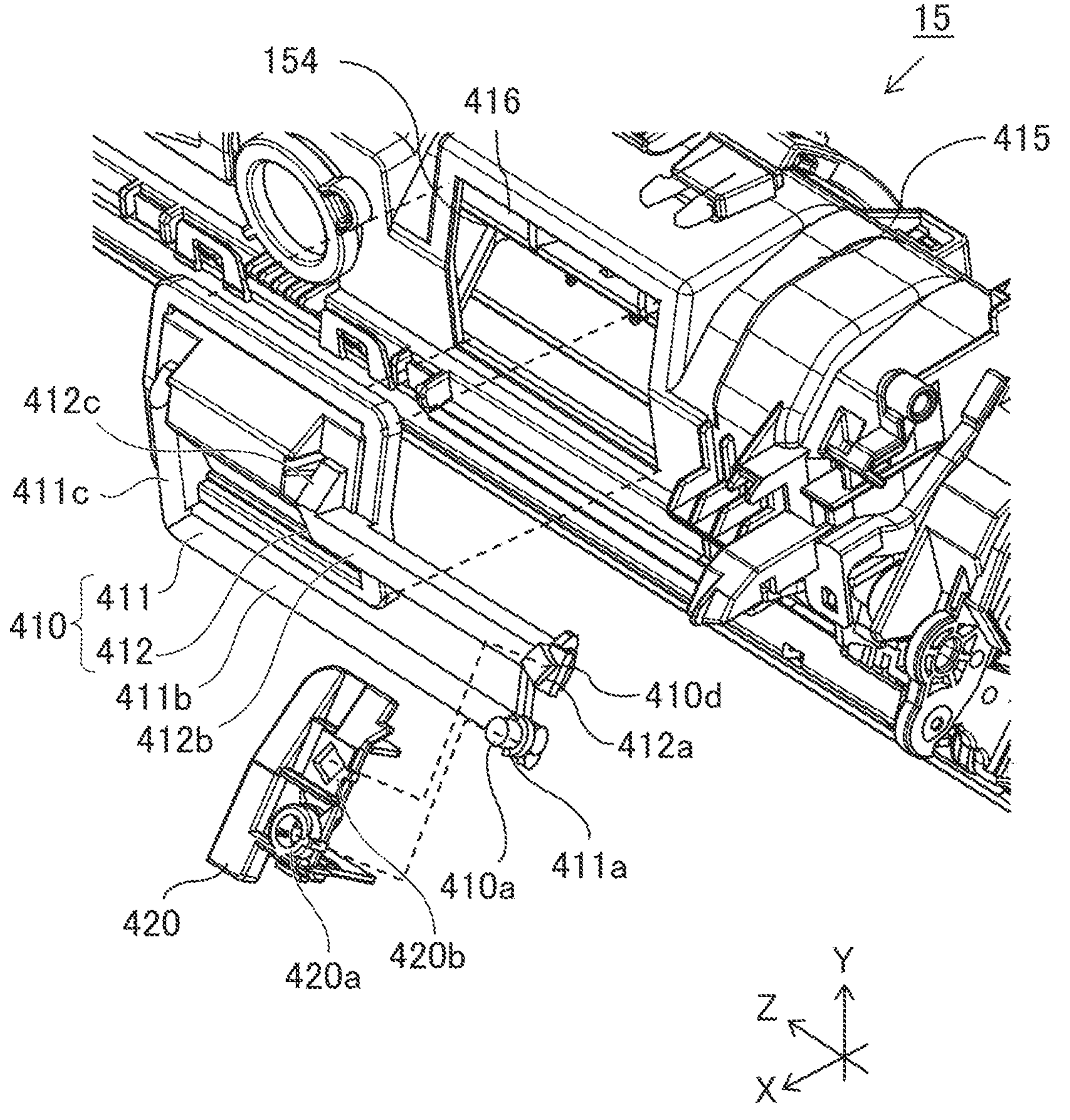

FIG. 15 is an exploded view in which a part of members of the developing unit according to the embodiment is demounted.

Figure 16:
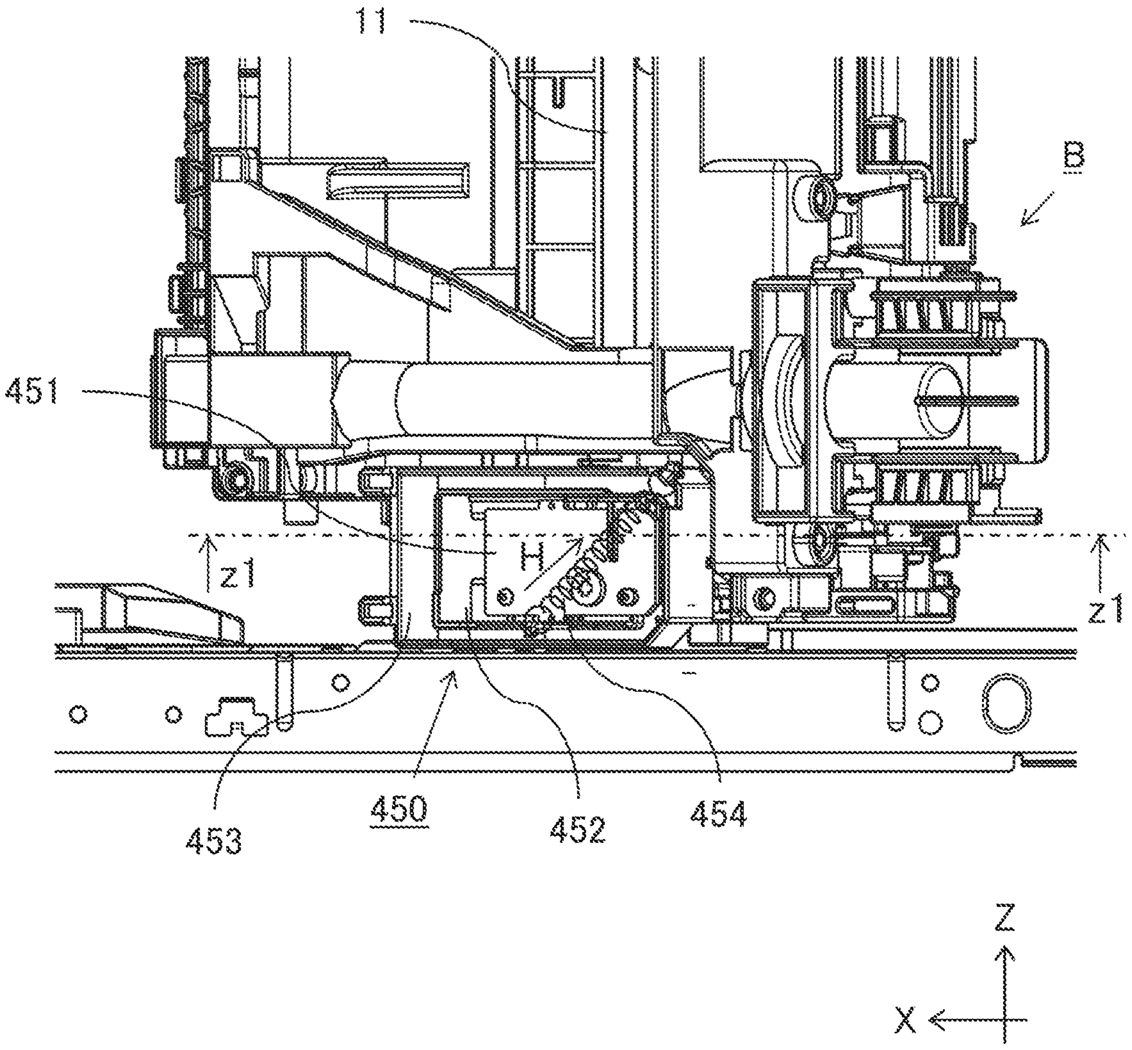

FIG. 16 is atop (plan) view showing a part of the process cartridge and a part of a printer main body according to the embodiment.

Figure 17:
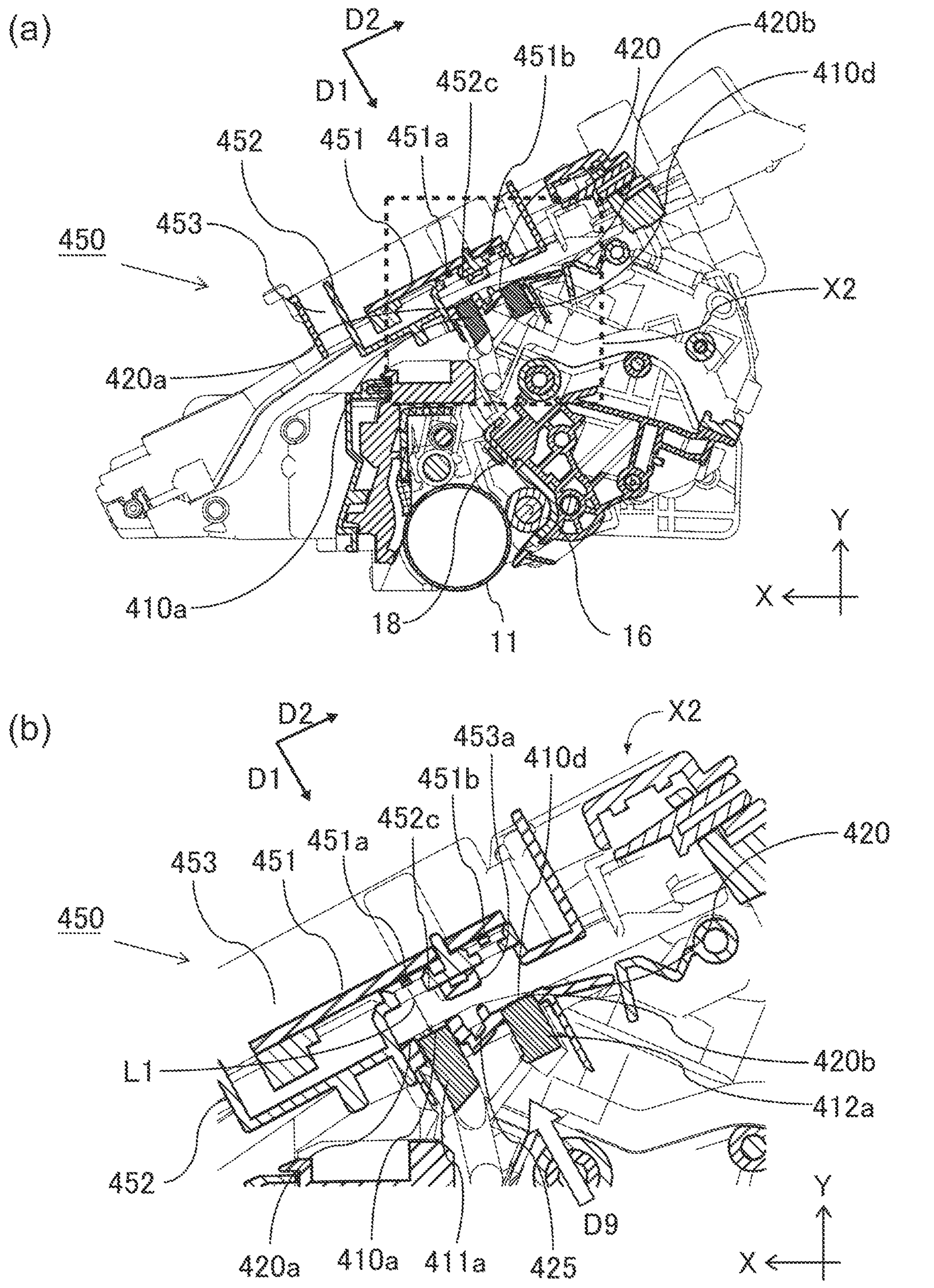

Part (a) of FIG. 17 is a sectional view of a part of the process cartridge and a part of the printer main body according to the embodiment along z1-z1 line of FIG. 16, and part (b) of FIG. 17 is an enlarged view of a part (a) of FIG. 17.

Figure 18:
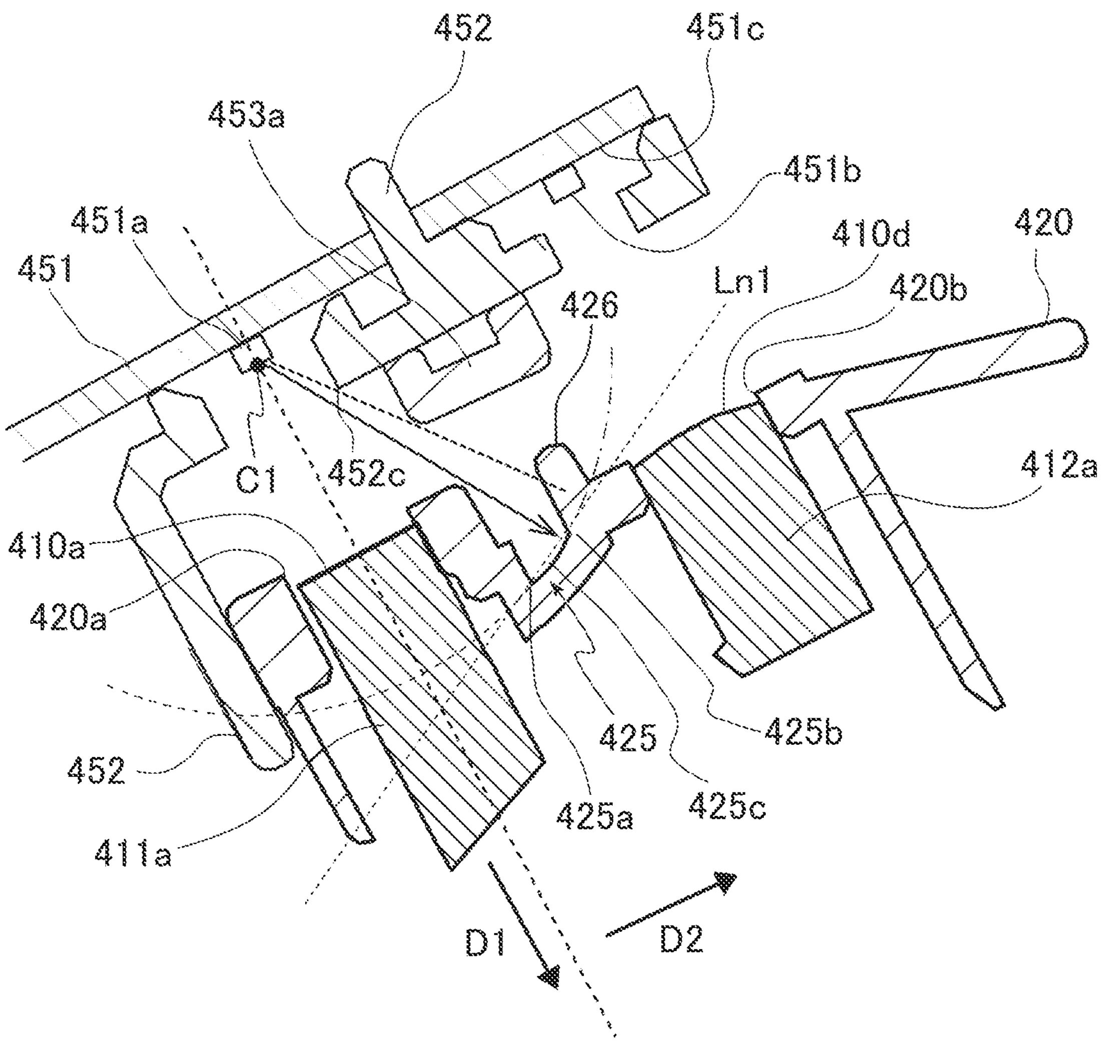

FIG. 18 is a schematic view showing a cross-sectional shape of a light guide cover according to the embodiment.

Figure 19:
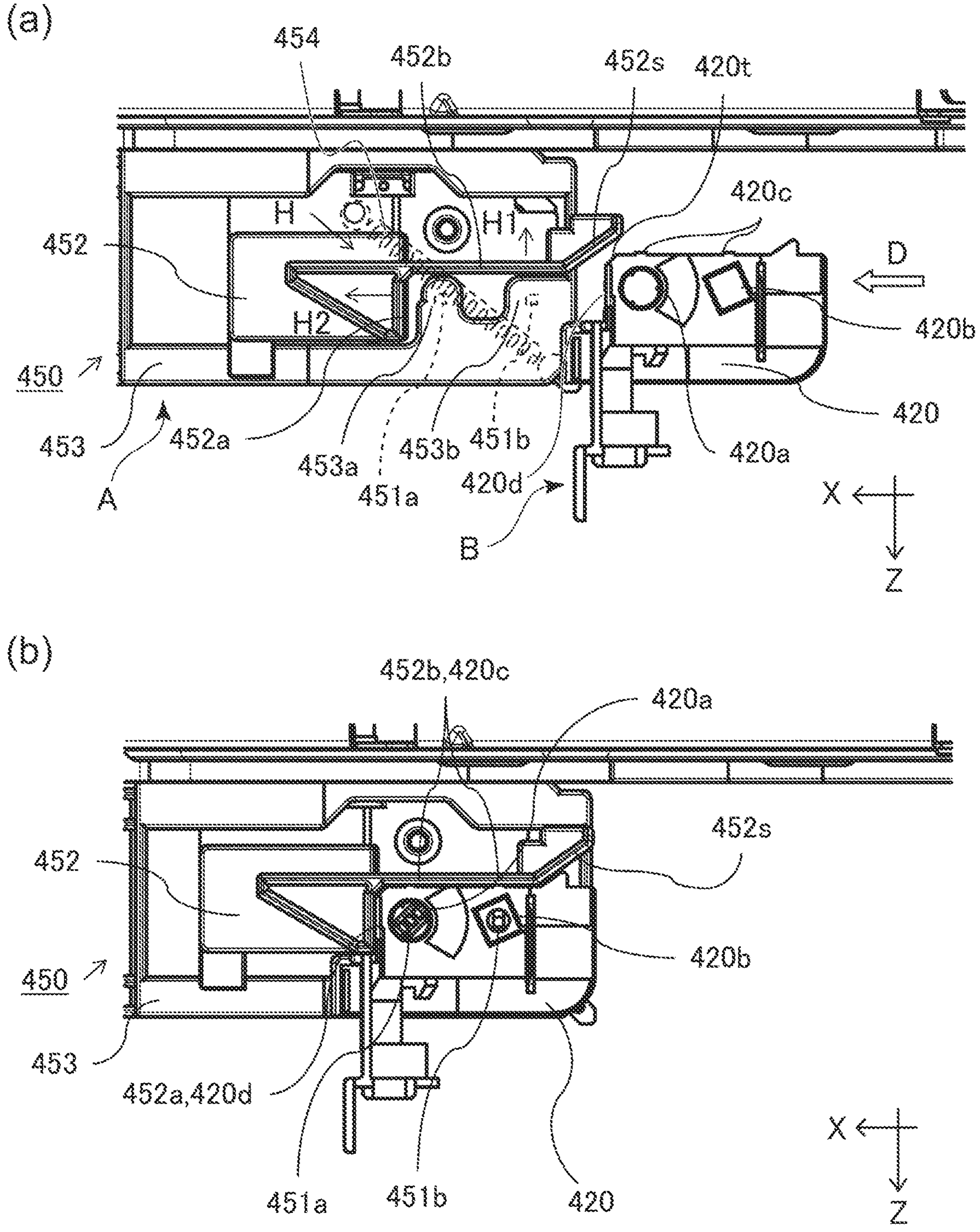

Parts (a) and (b) of FIG. 19 are schematic views showing a constitution for positioning members each other during mounting of the process cartridge according to the embodiment.

Figure 20:
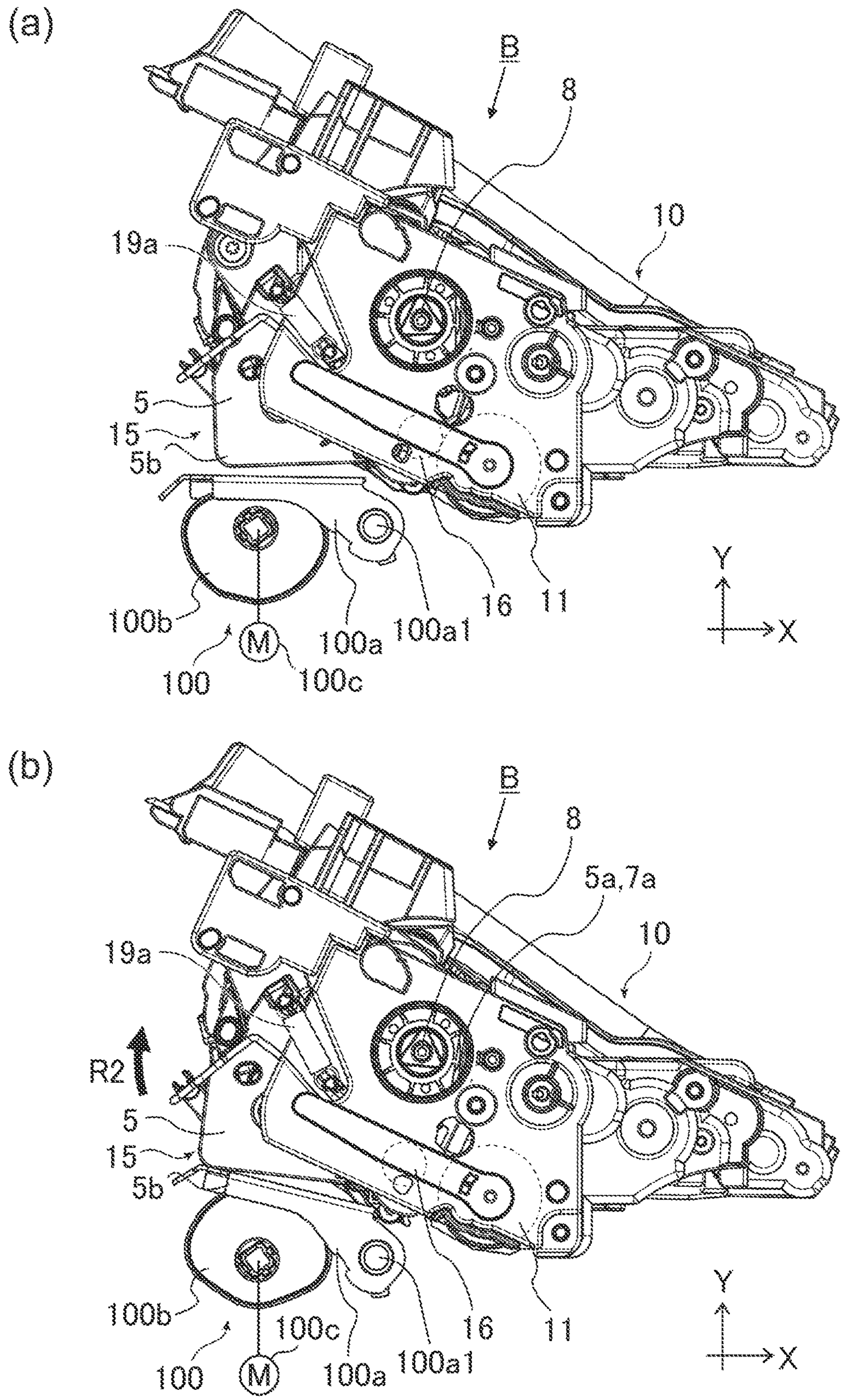

Part (a) and (b) of FIG. 20 are side views of the process cartridge according to the embodiment, in which part (a) shows a development contact state, and part (b) shows a development separation state.

Figure 21:
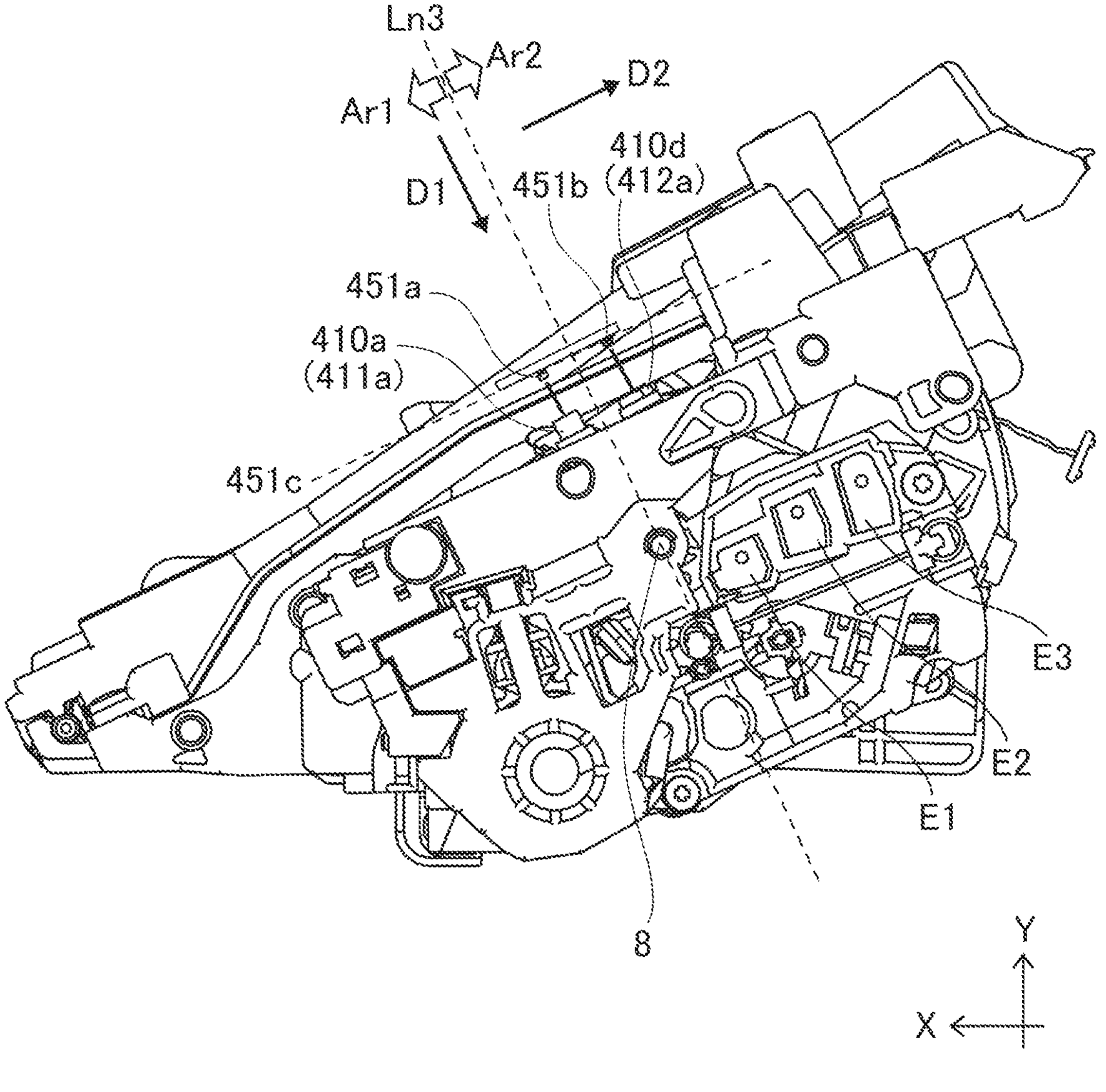

FIG. 21 is a side view showing the process cartridge according to the embodiment.

Figure 22:
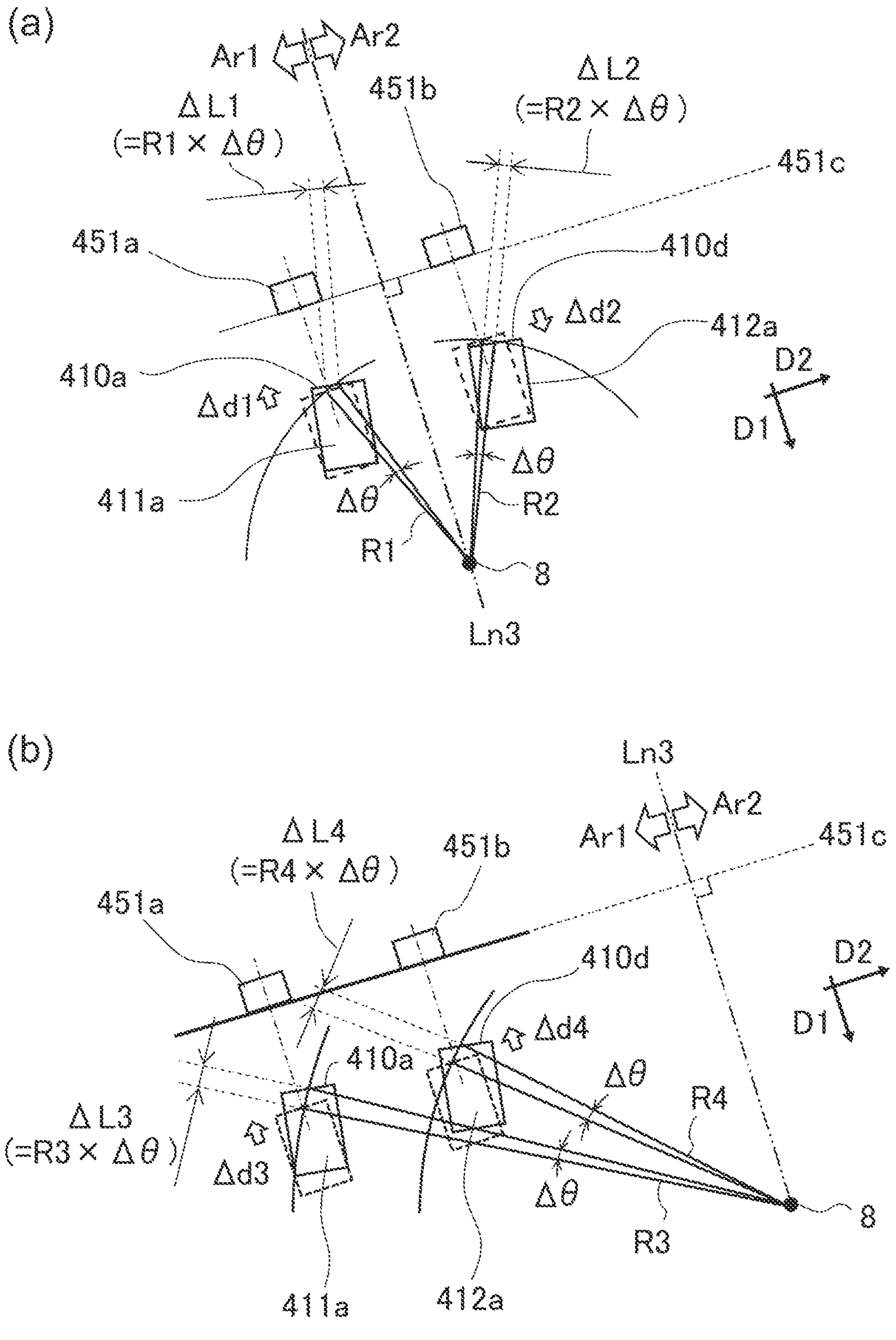

Part (a) of FIG. 22 is a schematic view showing an element arrangement of the process cartridge according to the embodiment, and part (b) of FIG. 22 is a schematic view showing an element arrangement of a process cartridge according to a comparison example.

Figure 23:
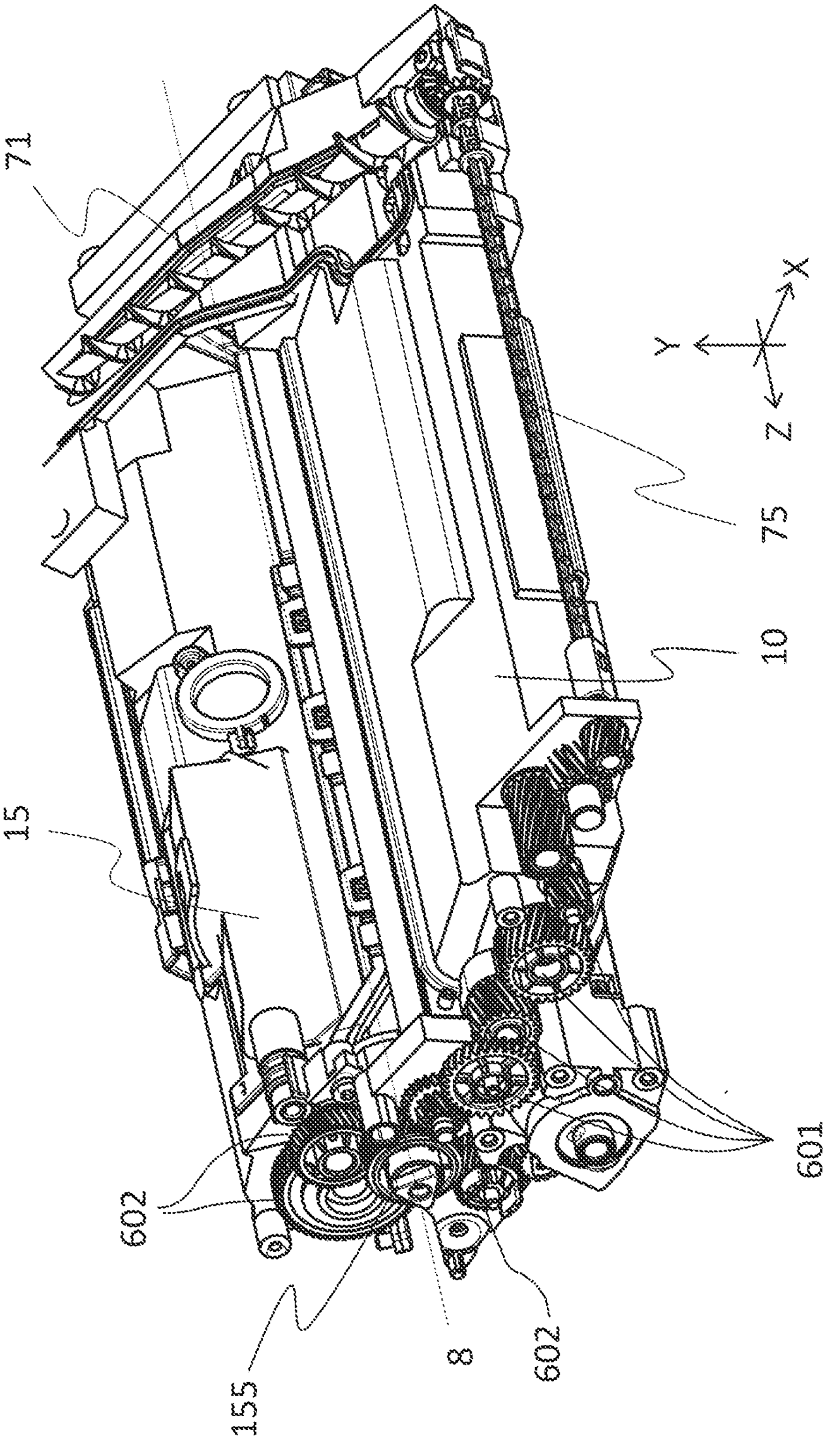

FIG. 23 is a perspective view showing a drive train of the process cartridge according to the embodiment.

DESCRIPTION OF THE EMBODIMENTS

In the following, an apparatus according to the present invention will be described while making reference to the drawings.

In the following description, an "image forming apparatus" is an apparatus for forming an image on a recording material (recording medium) with toner as a developer, and includes a single-function printer, a copying machine, and a multi-function printer.

A sheet used as the recording material includes paper such as plain paper or thick paper, a plastic film such as a sheet for an overhead projector, a special-shaped sheet such as an envelope or index paper, and a cloth.

<General Structure of Printer>

Figure 1:
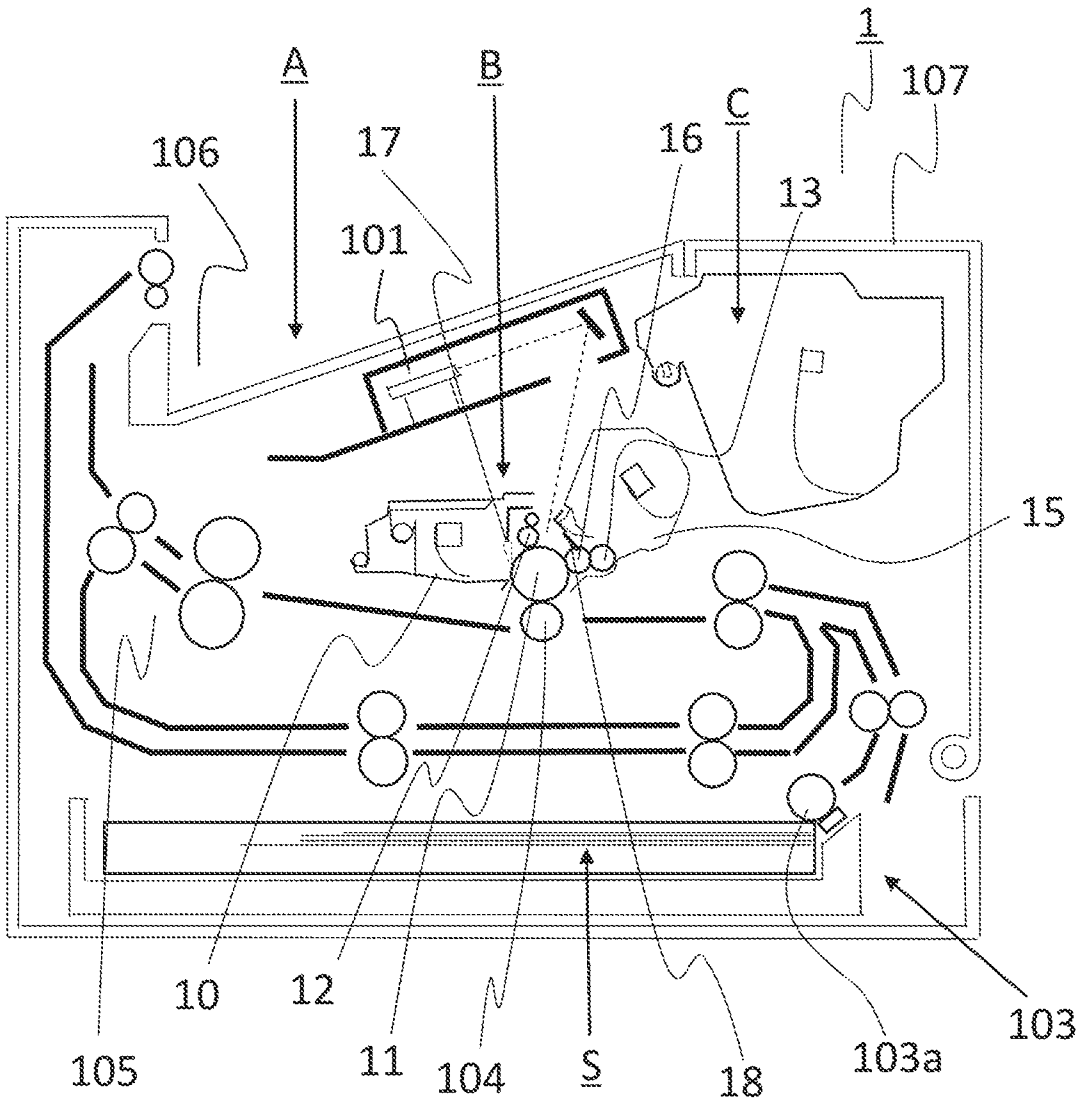
FIG. 1 is a schematic view of a printer according to an embodiment.

FIG. 1 is a schematic view showing a cross-sectional structure of a laser beam printer 1 (hereinafter, referred to as a printer 1) as the image forming apparatus according to an embodiment. The printer 1 is constituted by a printer main body A, a process cartridge B, and a toner cartridge C.

The printer main body A includes a sheet feeding portion 103, a transfer roller 104, a fixing device 105, and a laser scanner 101. The process cartridge B is provided detachably mountable to the printer main body A. The process cartridge B is prepared by integrally assembling an image bearing member and process means actable on the image bearing member into a unit and is mounted in an image forming apparatus main assembly so as to be removable from the image forming apparatus main assembly. The toner cartridge C accommodates the toner as the developer and is mounted in the apparatus main assembly so as to be removable from the apparatus main assembly. The printer main body A can be said as a portion in which the process cartridge B and the toner cartridge C are removed from the printer 1.

Figure 2:
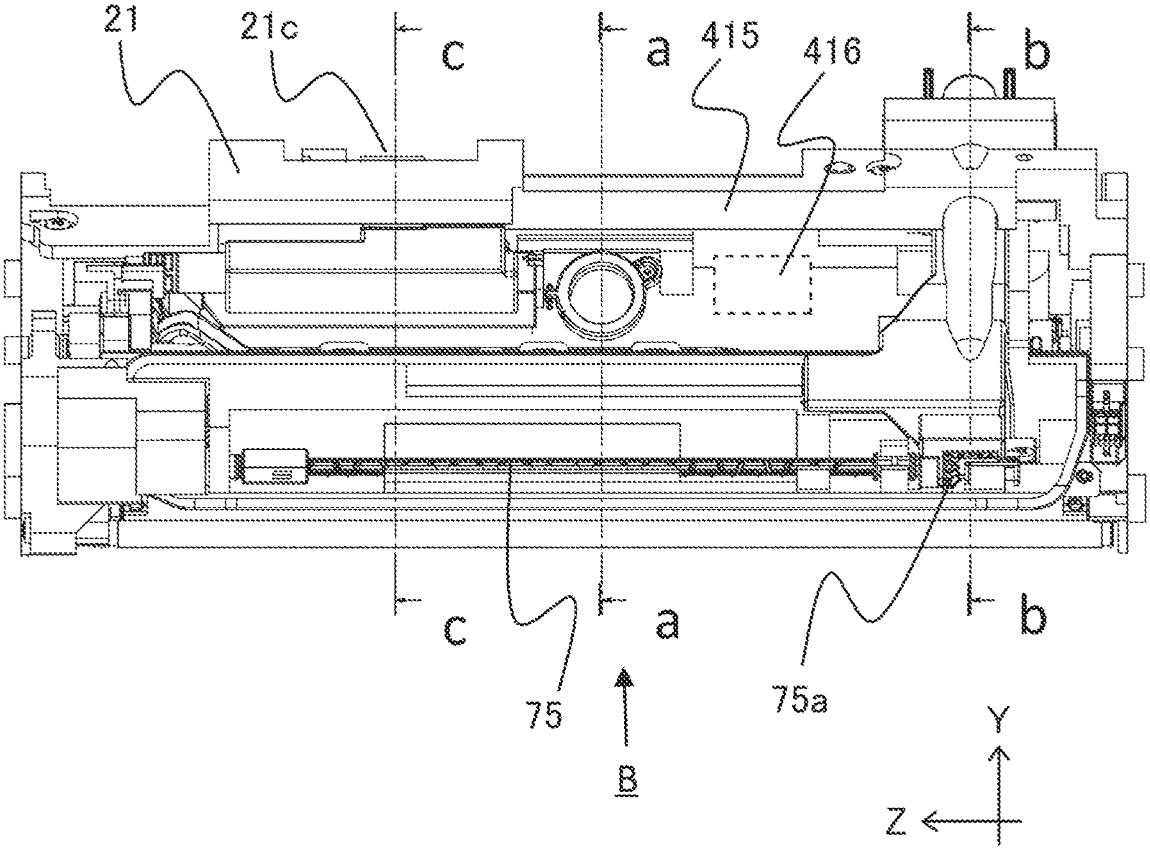
FIG. 2 is a front view of a process cartridge according to the embodiment.
Figure 3:
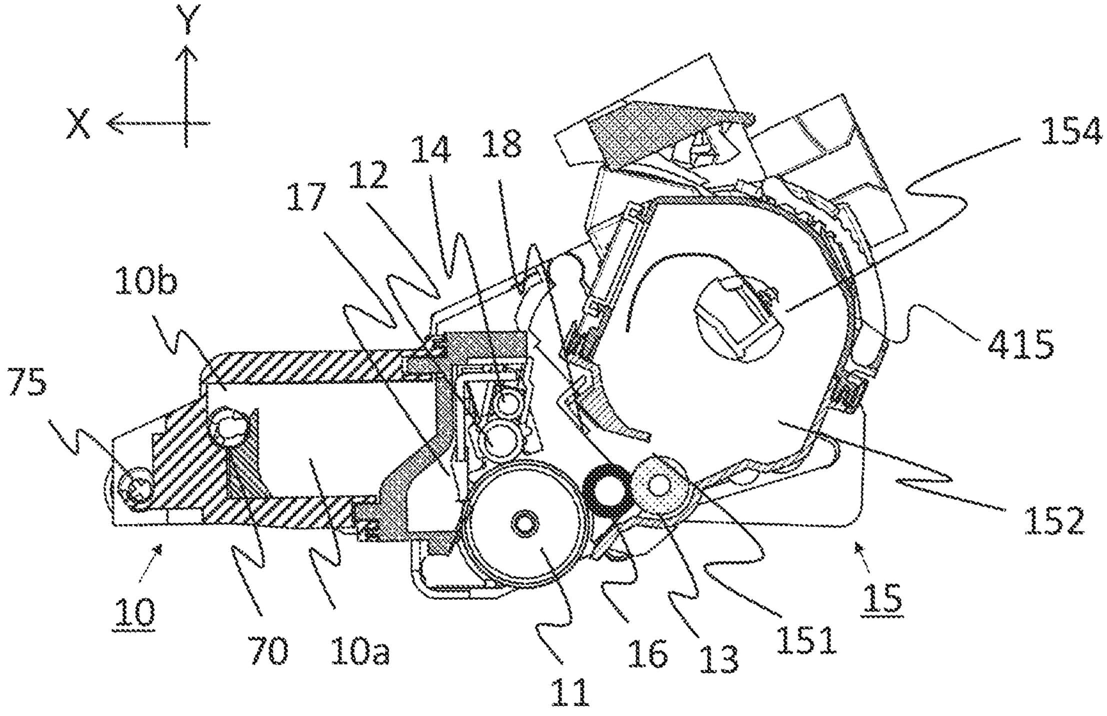
FIG. 3 is a sectional view of the process cartridge according to the embodiment.
Figure 4:
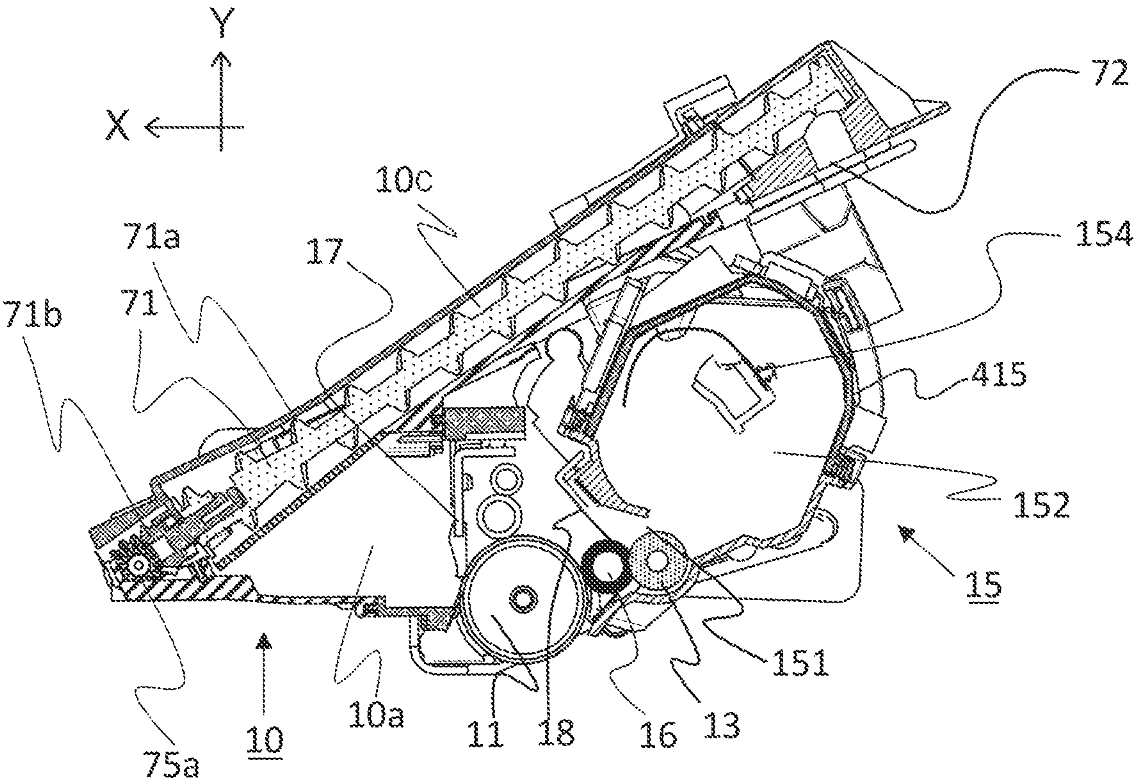
FIG. 4 is a sectional view of the process cartridge according to the embodiment.
Figure 5:
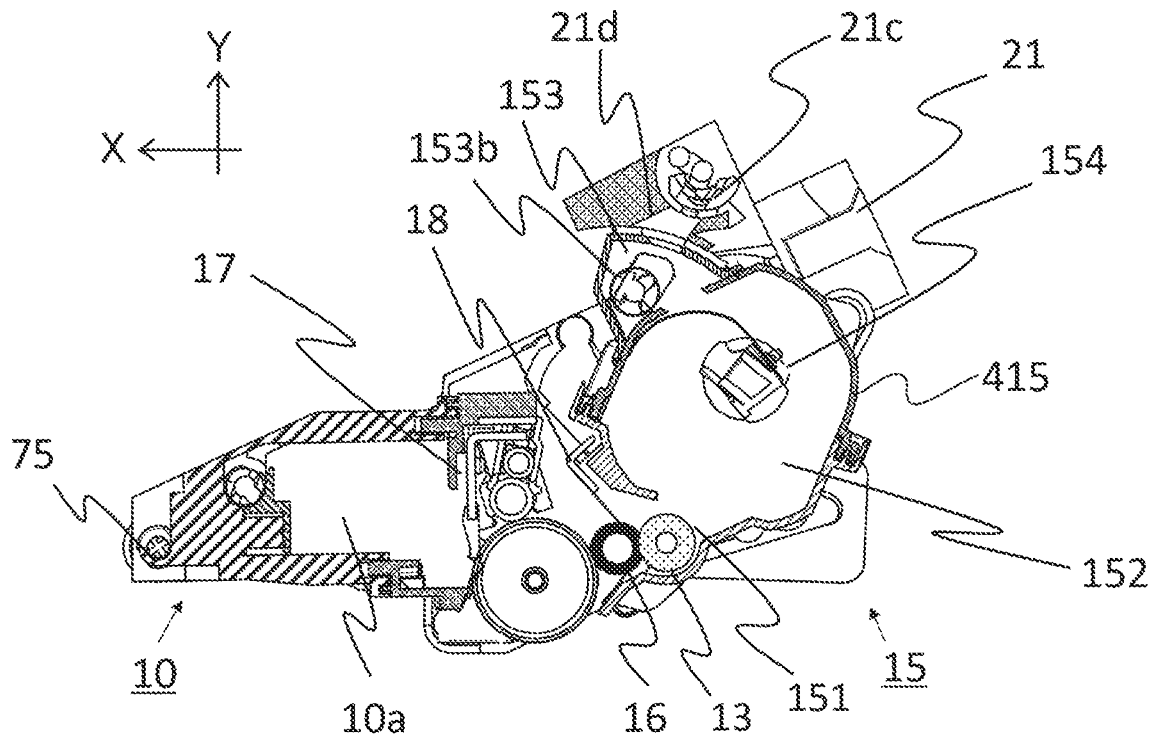
FIG. 5 is a sectional view of the process cartridge according to the embodiment.

The process cartridge B will be described using FIGS. 2 to 5. FIG. 2 is a front view (in which the process cartridge B is viewed from a left(-hand) side in FIG. 1) of the process cartridge B. FIG. 3 is a sectional view (a-a cross section of FIG. 2) of the process cartridge B. FIG. 4 is a sectional view (b-b cross section of FIG. 2) showing a second residual toner (waste toner) conveying passage 10*c* of the process cartridge B. FIG. 5 is a sectional view (c-c cross section of FIG. 2) showing a supply port of the process cartridge B.

In the following, a vertical direction (upward vertical direction) in a state in which the process cartridge B and the toner cartridge C are mounted and in which the printer main body A is installed on a horizontal surface is indicated by an arrow Y in FIG. 6 and the like. A longitudinal direction (rotational axis direction of a photosensitive drum 11) of the process cartridge B is indicated by an arrow Z. Further, a horizontal direction perpendicular to both the longitudinal direction (arrow Z) of the process cartridge B and the vertical direction (arrow Y) is indicated by an arrow X. Incidentally, element arrangements, shapes, and the like of the process cartridge B and the toner cartridge C will be described on the basis of the state in which the process cartridge B and the toner cartridge C are mounted in the printer main body A.

A side which is one end side of the process cartridge B with respect to the longitudinal direction and on which principally a driving force is inputted from the printer main body A into the process cartridge B is referred to as a driving side (left side of FIG. 2), and a side opposite from the driving side is referred to as anon-driving side (right side of FIG. 2). The arrow Z in the figures indicates a direction directed from the non-driving side toward the driving side. Further, an in-plane direction of an imaginary flat plane perpendicular to the longitudinal direction (arrow Z) is also referred collectively as a short(-side) direction of the process cartridge B.

As shown in FIGS. 2, 3, and 4, the process cartridge B is constituted by a cleaning unit 10 as a first unit (photosensitive member unit) and a developing unit 15 as a second unit. The cleaning unit 10 includes the photosensitive drum 11 as the image bearing member. The developing unit 15 includes a developing roller 16 as a developing means or a developer carrying member for carrying the toner as the developer.

The cleaning unit 10 includes the photosensitive drum 11 (photosensitive drum assembly), a cleaning blade 17 as a cleaning member for the photosensitive drum 11, and a charging roller 12 as a charging member. Further, the cleaning unit 10 includes a charging roller cleaner 14 as a cleaning member for the charging roller 12, a residual toner primary accommodating portion 10*a*, a first residual toner conveying passage 10*b*, and a second residual toner conveying passage 10*c*.

The photosensitive drum 11 is one in which a photosensitive layer is formed of an organic photosensitive member or the like on an outer peripheral side of a support formed in a cylindrical shape (drum shape). The charging roller 12 is provided so as to contact an outer peripheral surface of the photosensitive drum 11. The charging roller 12 electrically charges the photosensitive drum 11 by voltage application from a high-voltage substrate provided in the printer main body A. The charging roller 12 is rotated by the photosensitive drum 11 (i.e., is rotated by following rotation of the photosensitive drum 11).

The cleaning blade 17 is an elastic member provided so as to contact the outer peripheral surface of the photosensitive drum 11. The cleaning blade 17 elastically contacts the photosensitive drum 11 at a free end thereof, and removes residual toner (waste toner) described later from the photosensitive drum 11. The residual toner removed by the cleaning blade 17 is conveyed from the residual toner primary accommodating portion 10*a* to the toner cartridge C through the first residual toner conveying passage 10*b* and the second residual toner conveying passage 10*c*.

As shown in FIG. 5, the developing unit 15 includes a developing chamber 151 in which a developing roller 16 is disposed, a developer accommodating chamber 152 for supplying the toner to the developing chamber 151, and a receiving chamber 153 for receiving the toner supplied from the toner cartridge C. The developing chamber 151 and the developer accommodating chamber 152 are spaces formed inside a developing frame 415 as a container.

The developing roller 16 supplies the toner to a developing region (region where the photosensitive drum 11 opposes the developing roller 16. In the developing region, the developing roller develops an electrostatic latent image formed on the photosensitive drum 11. In the developing chamber 151, a supplying roller 13 for supplying the toner to the developing roller 16 is provided.

The developing blade 18 regulates an amount (layer thickness) of the toner deposited on a peripheral surface of the developing roller 16 in contact with the peripheral surface of the developing roller 16. Further, the developing blade 18 triboelectrically charges the toner deposited on the peripheral surface of the developing roller 16 by rubbing the toner, so that an electric charge is imparted to toner particles.

In the developer accommodating chamber 152, a stirring member 154 is provided. The toner accommodated in the developer accommodating chamber 151 is sent to the developing chamber 151 while being stirred by rotation of the stirring member 154 and is supplied to the developing roller 16. The stirring member 154 includes a shaft portion extending in the longitudinal direction and sheet-shaped stirring portion which projects from the shaft portion in a radial direction and which has flexibility. Incidentally, in the developing chamber 151, an application roller for applying the toner in the developing chamber 151 onto the developing roller 16 can be disposed.

A toner amount in the developer accommodating chamber 152 is detected by a residual amount detecting means described later. A controller of the printer main body A executes an operation, on the basis of a detection signal of the residual amount detecting means, for supplying the toner from the toner cartridge C to the process cartridge B in the case where the toner amount in the developer accommodating chamber 152 is a certain amount or less.

The receiving chamber 153 is configured to receive the toner from the toner cartridge C through a passage provided in the cleaning unit 10. Specifically, a stay 21 constituting a part of the cleaning unit 10 is provided with a supply port 21*c* for receiving the toner from the toner cartridge C and a delivery portion 21*d* for delivering the toner to the receiving chamber 153 of the developing unit 15.

Then, an operation of the printer 1 will be described using FIG. 1. The printer 1 starts an image forming operation in the case where the printer 1 receives image information from an external device, for example. When the image forming operation is started, the photosensitive drum 11 is rotationally driven by a driving source of the printer main body A, and a surface of the photosensitive drum 11 is electrically charged uniformly to a predetermined potential by the charging roller 12. Then, the charged surface of the photosensitive drum 11 is exposed to light on the basis of image information by the laser scanner 101. By this, electric charges of an exposed portion are removed, so that an electrostatic latent image is formed on the surface of the photosensitive drum 11. To this electrostatic latent image, toner is supplied from the developing roller 16, so that the electrostatic latent image is developed into a toner image. The toner image carried on the photosensitive drum 11 is conveyed to a transfer portion which is a nip between the photosensitive drum 11 and the transfer roller 104.

On the other hand, in parallel to preparation of such a toner image, the sheet feeding portion 103 conveys sheets S one by one. Specifically, a feeding roller 103*a* rotates and feeds the sheets S, stacked on a feeding tray, one by one. Thereafter, the sheet S is conveyed to the transfer portion. Then, during passing of the sheet S through the transfer portion, by a transfer roller 104 to which a transfer voltage is applied from a high-voltage substrate, the toner image is transferred from the photosensitive drum 11 onto the sheet S. Incidentally, toner (residual toner) remaining on the surface of the photosensitive drum 11 without being transferred from the photosensitive drum 11 onto the sheet S in the transfer portion is removed from the surface of the photosensitive drum 11 by the cleaning blade 17.

The sheet S on which the toner image is transferred is conveyed to the fixing device 105. The fixing device 105 is of a heat-fixing type, and heats and presses the toner image on the sheet S while nipping and conveying the nip of a rotatable member pair. By this, an image fixed on the sheet S is obtained. In the case of one-side printing, the sheet S passed through the fixing device 105 is discharged to an outside of the printer main body A by a discharging roller pair as a discharging means and is stacked on a discharge tray 106 provided at an upper surface of the printer main body A. In the case of double-side printing, the sheet S on which first side the image is formed by passing through the transfer portion and the fixing device 105 is reversed by the discharging roller pair also functioning as a reversing means, and then is conveyed again toward the transfer portion through a re-conveying passage. Then, the sheet S on which second side an image is formed by passing through the transfer portion and the fixing device 105 at a second time is discharged to the outside of the printer main body A by the discharging roller pair and is stacked on the discharge tray 106 provided at the upper surface of the printer main body A.

<Process Cartridge>

A structure of the process cartridge B in this embodiment will be described specifically using FIG. 3, parts (a) and (b) of FIG. 9, and parts (a) and (b) of FIG. 10. Parts (a) and (b) of FIG. 9 are exploded views of the process cartridge B. Part (a) of FIG. 10 is a side view showing a development contact state of the process cartridge B. Part (b) of FIG. 10 is a side view showing a development separation state of the process cartridge B.

As shown in parts (a) and (b) of FIG. 9, at an end portion of the developing unit 15 with respect to an axial direction of the developing roller 16, bearing members 4 and 5 are provided. The developing unit 15 is connected to the cleaning unit 10 so as to be swingable (rotatable) about a swing axis 8 defined by a rectilinear line passing through supporting shafts 8*a* and 8*b* described later. The swing axis 8 is substantially parallel to a rotational axis A11 of the photosensitive drum 11.

A frame of the cleaning unit 10 is constituted by a main frame 20, a stay 21, and a side cover 7. The main frame 20 supports the cleaning blade 17, the charging roller 12, and the charging roller cleaner 14. The photosensitive drum 11 is rotatably supported by a drum pin 22 mounted on the main frame 20 on one side and by a photosensitive drum supporting portion 7*b* provided in the side cover 7 on an opposite side.

A structure in which the developing unit 15 is supported by the cleaning unit 10 will be specifically described. As shown in part (a) of FIG. 9, a cylindrical-shaped portion 5*a* provided on the bearing member 5 is supported by a cylindrical hole-shaped portion 7*a* provided in the side cover 7 of the cleaning unit 10. The supporting shaft 8*a* is defined by a common axis to the cylindrical hole-shaped portion 7*a* of the side cover 7 and the cylindrical-shaped portion 5*a* of the bearing member 5. Further, as shown in part (b) of FIG. 9, a pin 6 is inserted so as to bridge over a cylindrical hole-shaped portion 20*a* of the main frame 20 of the cleaning unit 10 and a cylindrical-shaped portion 4*a* of the bearing member 4. The supporting shaft 8*b* is defined by a common axis to the pin 6 and the cylindrical hole-shaped portion 4*a* of the bearing member 4. The supporting shaft 8*a* and the supporting shaft 8*b* are disposed substantially on the same axis, so that the swing axis 8 is defined by the rectilinear line including the supporting shafts 8*a* and 8*b* as described above.

A projected portion 5*b* as a portion-to-be-pressed of the developing unit 15 described later is a part of the bearing member 5. That is, a portion (cylindrical portion 5*a*) where the developing unit 15 (second unit) is swingably supported by the cleaning unit 10 (first unit) and the projected portion

5*b* as the portion-to-be-pressed are provided on the same member (bearing member 5). By this constitution, positional accuracy between the projected portion 5*b* and the cylindrical shape 5*a* is improved, so that movement of the developing roller 16 by pressing of the projected portion 5*b* can be made with high accuracy. Incidentally, a cylindrical-shaped portion is provided on the side cover 7 in place of the cylindrical hole-shaped portion 7*a*, and a cylindrical hole-shaped portion engageable with this cylindrical-shaped portion may be provided in the bearing member 5.

The developing unit 15 is movable about the swing axis 8 between a contact position where the developing roller 16 contacts the photosensitive drum 11 and a separated position where the developing roller 16 is separated from the photosensitive drum 11. In the following, a state of the process cartridge B when the developing unit 15 is in the contact position is referred to as a “development contact state”, and a state of the process cartridge B when the developing unit 15 is in the separated position is referred to as a “development separation state”.

The process cartridge B includes pressing springs 19*a* and 19*b* as urging means for urging the developing unit 15. The pressing springs 19*a* and 19*b* are elastic members connecting the developing unit 15 and the cleaning unit 10 to each other, and tension spring are used in a constitution shown in FIG. 9. The developing unit 15 is urged toward the contact position by the pressing springs 19*a* and 19*b*.

Further, the printer A includes a separating mechanism 100 described later as an actuator for moving the developing unit 15 to the contact position and the separated position. A separation lever 100*a* as a pressing member is capable of moving the developing unit 15 between a position where the pressing member 100*a* holds the developing unit in the contact position and a position where the pressing member 100*a* permits movement of the developing unit 15 from the contact position to the separated position. That is, the separating mechanism 100 is capable of moving the developing unit 15 from the contact position to the separated position against an urging force of the pressing springs 19*a* and 19*b*.

An operation for moving the developing unit 15 between the contact position and the separated position will be described using parts (a) and (b) of FIG. 10 and parts (a) and (b) of FIG. 20. Part (a) of FIG. 10 is a side view of the process cartridge B in a development contact state, and part (a) of FIG. 20 is a detailed view thereof. Part (b) of FIG. 10 is a side view of the process cartridge B in a development separation state, and part (b) of FIG. 20 is a detailed view thereof. Incidentally, in order to illustrate the separating mechanism 100 of the printer A, from parts (a) and (b) of FIG. 10, the side cover 7 of the cleaning unit 10 is omitted.

As shown in parts (a) and (b) of FIG. 10 and parts (a) and (b) of FIG. 20, the bearing member 5 of the developing unit 15 is provided with a projected portion 5*b*. The projected portion 5*b* is a portion (portion-to-be-pressed) to be pressed by the separation lever 100*a* provided on the separating mechanism 100.

The separating mechanism 100 of the printer main body A includes the separation lever 100*a* as the pressing member, a separation cam 100*b* for moving the separation lever 100*a*, and a motor 100*c* for rotationally driving the separation cam 100*b*. The separation lever 100*a* is provided rotatably about a shaft 100*a*1 substantially parallel to a rotational axis of the developing roller 16. Every rotation of the separation cam 100*b* in a predetermined amount (for example, 180°) by the motor 100*c* on the basis of an instruction from a controller of the printer main body A, a position of the separation lever 100*a* is switched between a position where the separation lever 100*a* presses the projected portion 5*b* and a position where the separation lever 100*a* is retracted from the projected portion 5*b*.

As shown in part (a) of FIG. 10 and part (a) of FIG. 20, when the separation lever 100*a* is in the position where the separation lever 100*a* is separated from the projected portion 5*b*, by urging forces of the pressing springs 19*a* and 19*b*, the developing unit 15 is held in the contact position and the developing roller 16 contacts the photosensitive drum 11. In this state, the developing roller 16 is capable of developing the electrostatic latent image formed on the surface of the photosensitive drum 11. That is, the development contact state is a state in which image formation can be executed using the process cartridge B. Further, the contact position of the developing unit 15 is a position of the developing unit 15 during the image formation, in other words, a position where the developing unit 15 is capable of appropriately executing a developing process by the developer carrying member.

As shown in part (b) of FIG. 10 and part (b) of FIG. 20, the separation lever 100*a* of the separating mechanism 100 is capable of rotating the developing unit 15 in an arrow R2 direction against the urging forces of the pressing springs 19*a* and 19*b* in contact with the projected portion 5*b*. That is, by a force received by the projected portion 5 from the separation lever 100*a*, the developing unit 15 is rotated about the swing axis 8 in a direction (R2 direction) from the contact position toward the separated position. By this, the developing unit 15 is moved to the separated position, so that the developing roller 16 is separated from the photosensitive drum 11.

The development separation state is a state in the case where the process cartridge B does not execute the image forming operation (during non-image formation). Further, the separated position of the developing unit 15 is a position of the developing unit 15 during the non-image formation, in other words, a position where the developer carrying member is spaced away from the image bearing member than from a position where the developing unit is capable of executing a developing process by the developer carrying member. The controller of the printer main body A controls the motor 100*c*, for example, in a period in which the image formation is not carried out (during the non-image formation), such as a period after an image forming job and in which a subsequent job is not inputted, so that the process cartridge B is put in the development separation state.

When the separation lever 100*a* returns to an original position (part (a) of FIG. 10, part (a) of FIG. 20), the separation lever 100*a* is separated from the projected portion 5*b*. For this reason, by the urging forces of the pressing springs 19*a* and 19*b*, the developing unit 15 is moved from the separated position to the contact position. That is, as shown in part (a) of FIG. 10, the developing roller 16 is contacted again to the photosensitive drum 11.

Thus, a constitution in which the process cartridge B is capable of being switched in state between the development contact state and the development separation state was employed. For this reason, for example, during the non-image formation, the process cartridge B is put in the development separation state, so that it becomes possible to suppress a degree of deterioration of the toner and the photosensitive drum 11 and to suppress unnecessary toner consumption during the non-image formation.

<Outline of Toner Cartridge>

Figure 7:
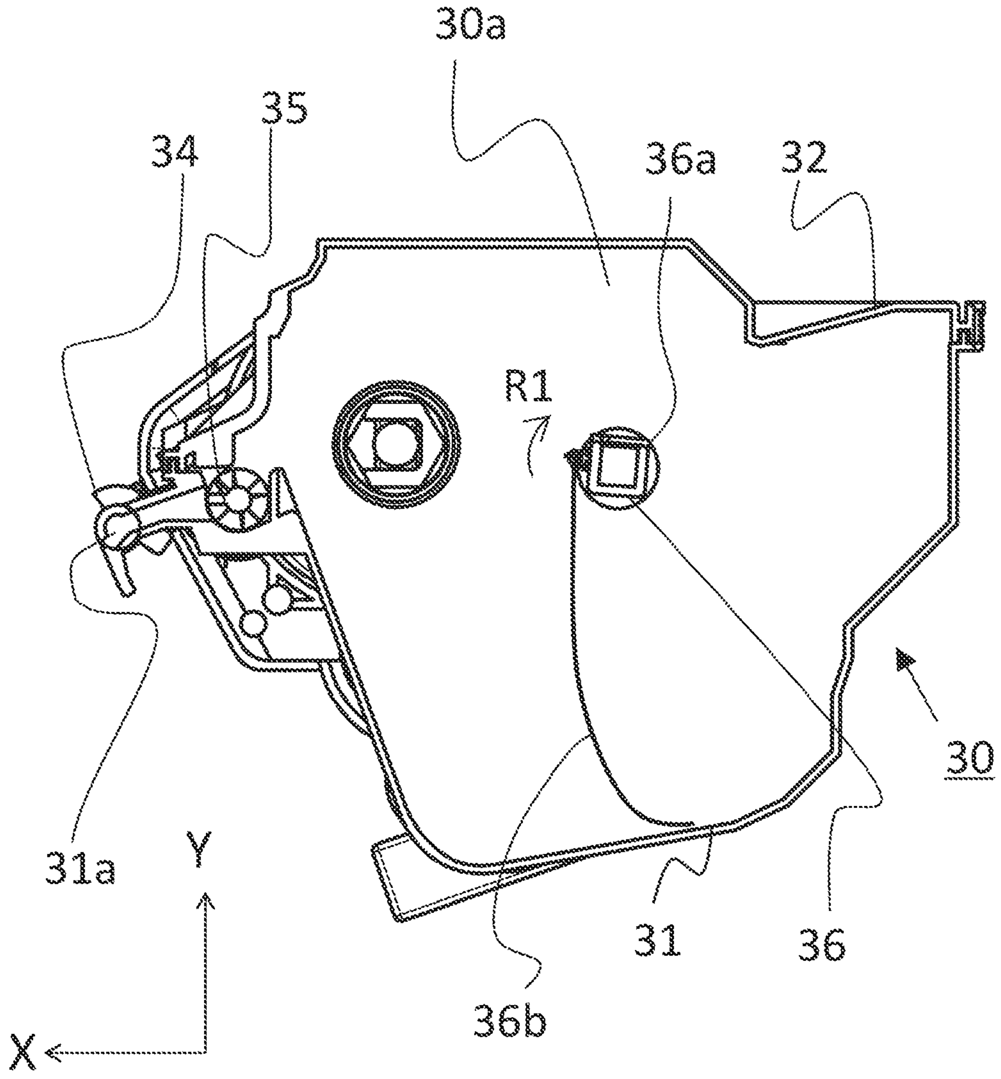
FIG. 7 is a sectional view of the toner container according to the embodiment.
Figure 8:
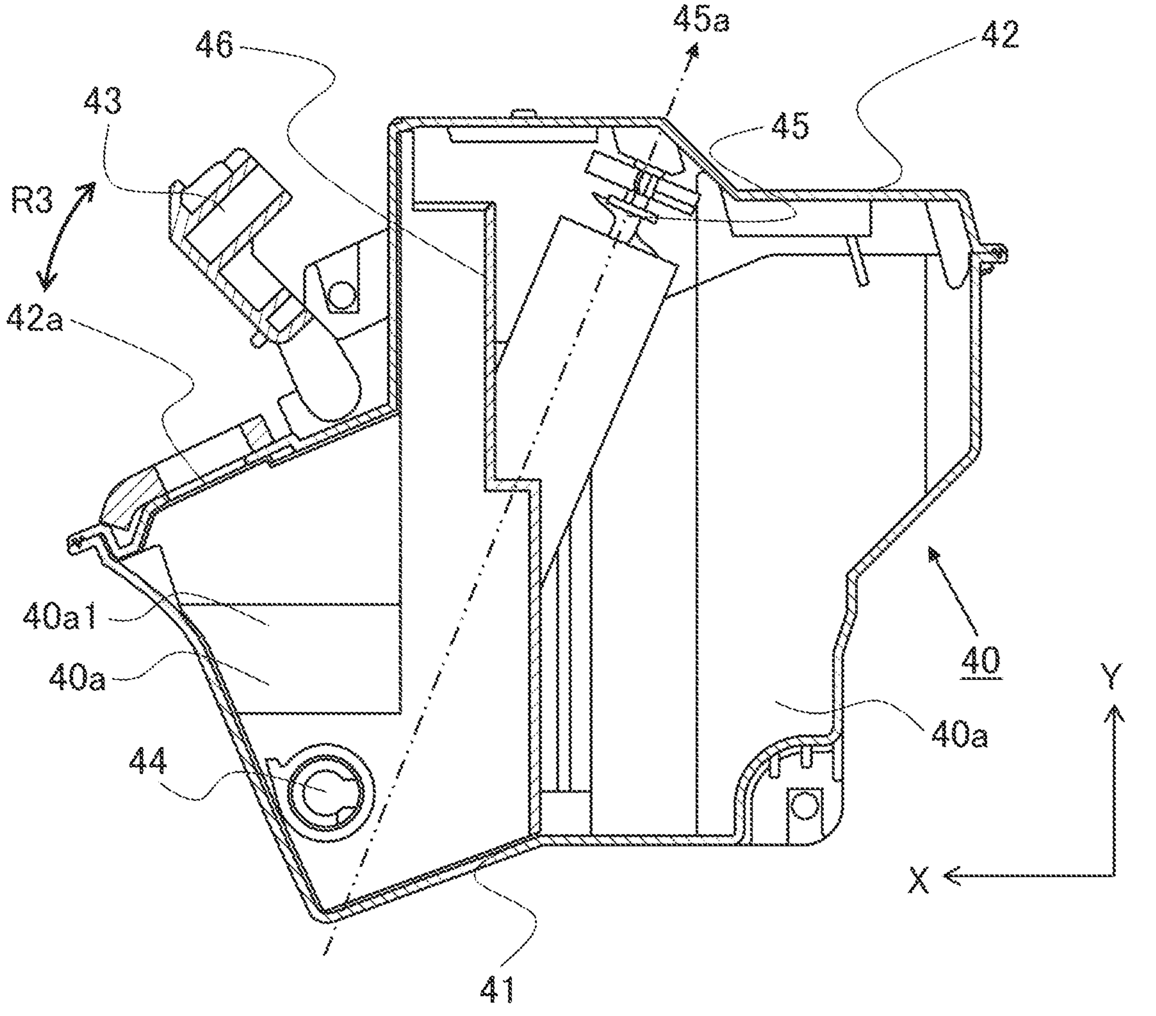
FIG. 8 is a sectional view of the toner container according to the embodiment.

The toner cartridge C will be described using FIGS. 6 to 8 and parts (a) and (b) of FIG. 13. FIG. 6 is a front view (schematic view in which the toner cartridge C is viewed from a left(-hand) side of FIG. 16) of the toner cartridge C. FIG. 7 is a sectional view (a-a cross section of FIG. 6) showing a toner supplying portion 30 of the toner cartridge C. FIG. 8 is a sectional view (b-b cross section of FIG. 6) showing a residual toner collecting portion of the toner cartridge C. Parts (a) and (b) of FIG. 13 are exploded views of the toner cartridge C.

Figure 6:
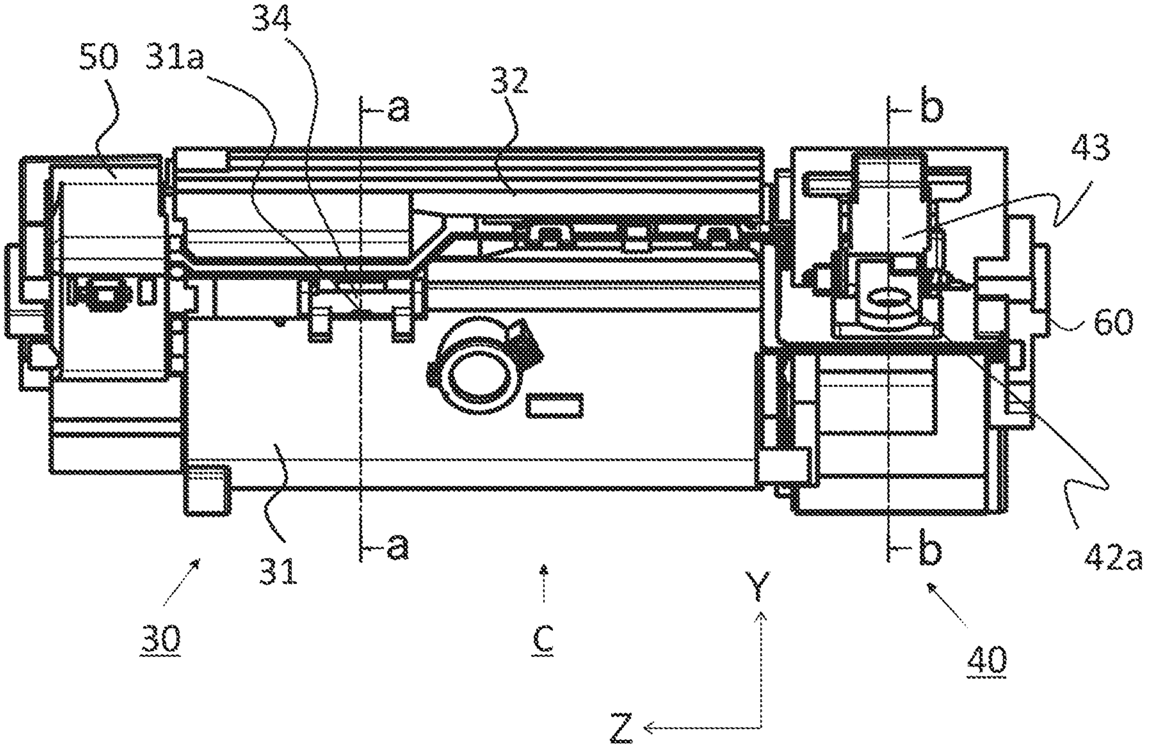
FIG. 6 is a front view of the toner container according to the embodiment.

As shown in FIG. 6, the toner cartridge C has an outer configuration extending in a predetermined longitudinal direction. A direction from one end side toward the other end side along the longitudinal direction of the toner cartridge C is indicated by an arrow Z in FIG. 6 and the like. The longitudinal direction of the toner cartridge C is substantially parallel to a direction of the rotational axis of the photosensitive drum 11 and a direction of a rotational axis of the developing roller 16. That is, the longitudinal direction of the toner cartridge C is substantially parallel to a longitudinal direction of the process cartridge B.

The directions of the arrows X, Y, and Z shown in FIG. 6 and the like are common with these (FIG. 2 and the like) described above for the process cartridge B.

A side which is one end side of the toner cartridge C with respect to the longitudinal direction and on which principally a driving force is inputted from the printer main body A to the toner cartridge C is referred to as a driving side (left side of FIG. 6), and an opposite side thereof is referred to as a non-driving side (right side of FIG. 6). In this embodiment, the driving side is a side on which the toner supplying portion 30 is disposed relative to the residual toner collecting portion 40, and the non-driving side is a side on which the residual toner collecting portion 40 is disposed relative to the toner supplying portion 30. Further, an in-plane direction on an imaginary flat plane perpendicular to the longitudinal direction (arrow Z) is also collectively referred to as a short (side) direction.

<Toner Supplying Portion>

As shown in FIG. 6, the toner cartridge C includes the toner supplying portion for supplying the toner to the process cartridge B, the residual toner collecting portion 40 for collecting the residual toner from the process cartridge B, and a pump unit 37.

The toner supplying portion 30 includes a toner accommodating portion 30*a* for accommodating the toner as shown in FIG. 6, FIG. 7, and parts (a) and (b) of FIG. 13. The toner accommodating portion 30*a* is formed by a supplying portion frame 31 and a supplying portion cover 32. The supplying portion frame 31 is provided with a toner outlet port (discharge opening) 31*a* for permitting discharge of the toner in the toner accommodating portion toward the developing unit 15. The toner outlet port 31*a* is disposed so as to oppose a supply port (supply opening) 21*c* (FIG. 5) of the process cartridge B in a state in which the toner cartridge C is mounted in the printer main body A. The toner outlet port 31*a* and the supply port 21*c* communicate with each other, so that the toner can be supplied to the process cartridge B. Outside the supply portion frame 31, a shutter member 34 for opening the toner outlet port 31*c* in a closed state in interrelation with mounting of the toner cartridge C into the printer main body A is provided.

In the toner accommodating portion 30*a*, a supplying screw 35 as a screw portion for conveying the toner toward the toner outlet port 31*a* and a stirring and conveying unit 36 as a stirring and conveying member for stirring the toner and for conveying the toner toward the supplying screw 35 are provided.

Each of the supplying screw 35 and the stirring and conveying unit 36 conveys and stirs the toner by being rotated about its rotational axis extending in the longitudinal direction. That is, each of the supplying screw 35 and the stirring and conveying unit 36 is an example of a toner conveying means for conveying the toner. The stirring and conveying unit 36 includes a shaft portion 36*a* to which a driving force is transmitted and a stirring portion 36*b* which projects from the shaft portion 36*a* in a radial direction and which conveys and stirs the toner by being rotated together with the shaft portion 36*a*. The shaft portion 36*a* extends in the longitudinal direction so as to penetrate through the toner accommodating portion 30*a*. The stirring portion 36*b* is formed with a flexible resin sheet, for example. The toner conveyed to the toner outlet port 31*a* by the stirring and conveying unit 36 and the supplying screw 35 is discharged through the toner outlet port 31*a* by the pump unit 37.

As shown in parts (a) and (b) of FIG. 13, the pump unit 37 includes a pump 37*a* constituted so as to change an inside volume thereof by being expanded and contracted in the longitudinal direction of the toner cartridge C and a cam 37*b* provided rotatably and coaxially with the pump 37*a*. Further, the pump unit 37 includes a link arm 37*c* for expanding and contracting the pump 37*a* by being moved rectilinearly in the longitudinal direction with rotation of the cam 37*b*.

The pump 37*a* has a cylindrical outer configuration, and a cylindrical side surface portion thereof is formed in a bellows-like shape.

Accordingly, the pump 37*a* is capable of being expanded and contracted in a direction along a center axis of the cylindrical-shaped portion. The cam 37*b* and the link arm 37*c* constitute a cam mechanism for driving the pump 37*a* for converting a rotational driving force inputted to the toner cartridge C into translatory (rectilinear) motion (expanding and contracting motion) in a contraction direction of the pump 37*a* and an expansion direction opposite to the contraction direction.

<Driving Constitution of Toner Supplying Portion>

A driving constitution of the toner supplying portion 30 will be described using FIG. 7 and parts (a) and (b) of FIG. 13. As shown in parts (a) and (b) of FIG. 13, the toner supplying portion 30 includes a stirring drive input portion 38 (first drive input portion) for driving the stirring and conveying unit 36 and a pump/screw drive input portion 39 (second drive input portion) for driving the pump unit 37 and the supplying screw 35. Each of the stirring and conveying unit 38 and the pump/screw drive input portion 39 is disposed on one end side (driving side) with respect to the longitudinal direction of the toner cartridge C.

The toner cartridge C is provided with the stirring drive input portion 38 and the pump/screw drive input portion 39 separately from each other, so that the stirring and conveying unit 36, the pump unit 37, and the supplying screw 35 can be drive-controlled independently. Specifically, the stirring and conveying unit 36 is continuously driven during the image formation, while the pump unit 37 and the supplying screw 35 can be driven intermittently only at a timing when the supply of the toner to the process cartridge B is needed. The timing when the supply of the toner to the process cartridge B is needed is discriminated by a controller of the printer main body A on the basis of a detection signal of the above-described remaining amount detecting means.

As viewed in the longitudinal direction, adjacent to the stirring drive input portion 38, a stirring driving-side gear 38*b* for transmitting the rotational driving force to the stirring and conveying unit 36 is disposed. The stirring driving-side gear 38*b* is provided coaxially with the stirring and conveying unit 36 on one end side with respect to the longitudinal direction, and is rotated integrally with the stirring and conveying unit 36. The stirring driving-side gear 38*b* rotates the stirring and conveying unit 36 in the R1 direction of FIG. 7 by receiving the driving force from the stirring drive input portion 38. By the rotation of the stirring and conveying unit 36 in the R1 direction, the toner in the toner accommodating portion 30*a* is conveyed toward the supplying screw 35.

As viewed in the longitudinal direction, adjacent to the pump/screw drive input portion 39, a cam driving gear 39*a* rotated by receiving a driving force from the pump/screw drive input portion 39 is provided. Adjacent to the cam driving gear 39*a*, a cam gear 39*b* rotated by receiving the driving force from the cam driving gear 39*a* is provided. The cam gear 39*b* is formed integrally with a cam 37*b*. For that reason, the cam gear 39*b* is rotated with rotation of the pump screw drive input portion 39, whereby the cam 37*b* of the pump unit 37 is rotated. Then, by the rotation of the cam 37*b*, the link arm 37*c* moves rectilinearly in the longitudinal direction, so that the pump 37*a* is expanded and contracted.

As viewed in the longitudinal direction, adjacent to the cam gear 39*b*, a screw driving gear 39*c* for transmitting a rotational driving force to the supplying screw 35 is provided. The screw driving gear 39*c* is provided coaxially with the supplying screw 35 on one end side with respect to the longitudinal direction, and is rotated integrally with the supplying screw 35. The screw driving gear 39*c* rotates the supplying screw 35 by receiving the driving force from the cam gear 39*b*. By rotation of the supplying screw 35, the toner in the toner accommodating portion 30*a* is conveyed toward the toner outlet port 31*a* in the longitudinal direction.

As shown in FIG. 6 and parts (a) and (b) of FIG. 13, at an end portion of the toner cartridge C on the driving side, the driving-side side cover 50 is provided. The driving-side side cover 50 is fixed to the toner accommodating portion 30*a* (supplying portion frame 31). The driving-side side cover 50 is a part of the toner cartridge C. The driving-side side cover 50 shaft-supports the stirring drive input portion 38 and the pump/screw drive input portion 39 so as to be rotatable.

Further, the driving-side side cover 50 is provided with a positioning boss 50*a* and a portion-to-be-guided 50*b*. These members has a function of regulating an attitude of the toner cartridge C when the toner cartridge C is mounted in the printer main body A as described later.

<Residual Toner Collecting Portion>

Next, an outline of the residual toner collecting portion 40 will be described. As shown in FIG. 8, the residual toner collecting portion 40 includes a residual toner accommodating portion 40*a*. The residual toner accommodating portion 40*a* is formed by an accommodating portion frame 41 and an accommodating portion cover 42. The accommodating portion cover 42 is provided with a residual toner inlet port (receiving opening) 42*a* for receiving the residual toner collected from the process cartridge B. The residual toner collecting portion 40 includes a shutter member 43 for opening and closing the residual toner inlet port 42*a*. The shutter member 43 is opened and closed in an arrow R3 direction in interrelation with mounting and demounting of the toner cartridge C relative to the printer main body A.

As shown in parts (a) and (b) of FIG. 13, inside the residual toner accommodating portion 40*a*, a partitioning member 46, and a first residual toner screw 44 and a second residual toner screw 45 which are as residual toner conveying means for conveying the residual toner in the residual toner accommodating portion 40*a* are provided. The first residual toner screw 44 conveys the residual toner, dropped from the residual toner inlet port 42*a*, in the longitudinal direction of the toner cartridge C. The second residual toner screw receives the driving force from the first residual toner screw 44 and conveys the residual toner, conveyed from the first residual toner screw 44, obliquely upward.

To the residual toner accommodating portion 40*a*, drive is transmitted in the following manner. As shown in parts (a) and (b) of FIG. 13, the stirring and conveying unit 36 is provided with a stirring non-driving-side gear 38*a* on a side opposite from the above-described stirring driving-side gear 38*b* with respect to the longitudinal direction. The driving force inputted to the above-described stirring driving-side gear 38*b* on the driving side of the toner supplying portion 30 is transmitted to a non-driving side of the toner supplying portion 30 through the stirring and conveying unit 36, and thus is transmitted to the stirring non-driving-side gear 38*a*.

As viewed in the longitudinal direction, adjacent to the stirring non-driving-side gear 38*a*, a gear train 710 is provided for transmitting drive to the first residual toner screw 44 in the residual toner accommodating portion 40*a*. That is, the first residual toner screw 44 is rotated by receiving the driving force from the printer main body A via the stirring drive input portion 38, the stirring driving-side gear 38*b*, the stirring and conveying unit 36, the stirring non-driving-side gear 38*a*, and the gear train 710.

As shown in FIG. 6 and parts (a) and (b) of FIG. 13, at an end portion of the toner cartridge C on the non-driving side (residual toner collecting portion 40 side), a non-driving-side side cover 60 is provided. The non-driving-side side cover 60 is fixed to the residual toner accommodating portion 40*a* (accommodating portion frame 41). The non-driving-side side cover 60 is a part of the frame of the toner cartridge C.

Further, the non-driving-side side cover 60 is provided with a positioning boss 60*a* and a portion-to-be-guided 60*b*. These members has a function of regulating an attitude of the toner cartridge C when the toner cartridge C is mounted in the printer main body A as described later.

<Mounting and Demounting Method of Process Cartridge and Toner Cartridge C>

Next, a mounting and demounting method of the process cartridge B and the toner cartridge C relative to the printer main body A will be described using parts (a) and (b) of FIG. 11 and parts (a) to (c) of FIG. 12. Parts (a) and (b) of FIG. 11 are perspective views for illustrating mounting of the process cartridge B and the toner cartridge C into the printer main body A. Parts (a) to (c) of FIG. 12 are side views for illustrating the mounting of the process cartridge B and the toner cartridge C into the printer main body A.

As shown in part (a) of FIG. 11, inside the printer main body A, a mounting portion which is a space for mounting the process cartridge B and the toner cartridge C is provided. On an outer surface of the printer main body A, an openable door 107 rotatable (openable) about a rotational axis R5 relative to the printer main body A is provided. Parts (a) and (b) of FIG. 11 show a state in which the openable door 107 is open. The openable door 107 is opened, so that the mounting portion of the inside of the printer main body A is exposed to the outside of the printer main body A.

Further, the printer main body A includes guiding portions 108 and 109.

As shown in parts (a) and (b) of FIG. 9, at opposite end portions of the process cartridge B with respect to the longitudinal direction, upper bosses 93 and 94, lower bosses 95 and 96, and end bosses 97 and 98 are provided. Specifically, on a side surface of the process cartridge B on the driving side, the upper boss 94, the lower boss 96 provided below the upper boss 94, and the end boss 98 provided downstream of the upper boss 94 with respect to a mounting direction D are provided. On a side surface of the process cartridge B on the non-driving side, the upper boss 93, the lower boss 95 provided below the upper boss 93, and the end boss 97 provided downstream of the upper boss 93 with respect to the mounting direction D are provided. The upper bosses 93 and 94 function as first portions-to-be-guided which are guided by the guiding portions 108 and 109 of the printer main body A. The end bosses 97 and 98 function as second portions-to-be-guided which are guided by the guiding portions 108 and 109 of the printer main body A. Further, the stay 21 of the process cartridge B includes toner container positioning portions 21*a* and 21*b* (part (b) of FIG. 9).

The toner cartridge C is provided with positioning bosses 50*a* and 60*a* and portions-to-be-guided 50*b* and 60*b* as shown in parts (a) and (b) of FIG. 13. The positioning bosses 50*a* and 60*a* are provided on opposite end sides with respect to the longitudinal direction of the toner cartridge C, and the portion-to-be-guided 50*b* and 60*b* are also provided on the opposite end sides with respect to the longitudinal direction of the toner cartridge C. Further, with respect to the mounting direction D (part (b) of FIG. 11), the portions-to-be-guided 50*b* and 60*b* are positioned on a side upstream of the positioning bosses 50*a* and 60*a*.

First, the process cartridge B is mounted in the printer main body A. As shown in part (a) of FIG. 11 and part (a) of FIG. 12, the process cartridge B is inserted in the arrow D direction while being guided by the guiding portions 108 and 109. For that reason, on the driving side, the guiding portion 109 is sandwiched between the upper boss 94, the end boss 98, and the lower boss 96 in a state in which the upper boss 94 and the end boss 98 are placed on the guiding portion 109. On the non-driving side, the guiding portion 108 is sandwiched between the upper boss 93, the end boss 97, and the lower boss 95 in a state in which the upper boss 93 and the end boss 97 are placed on the guiding portion 108. By this, the process cartridge B is moved in the mounting direction D while being guided by the guiding portions 108 and 109. That is, the mounting direction D of the process cartridge B is a direction in which the process cartridge B is moved along the guiding portions 108 and 109.

More specifically, the mounting direction D of the process cartridge B is a direction along an imaginary rectilinear line connecting a lower surface of the upper boss 93 (first portion-to-be-guided) and a lower surface of the end boss 97 (second portion-to-be-guided) as shown in parts (a) and (b) of FIG. 12 in a state in which the process cartridge B is viewed in the longitudinal direction. This imaginary rectilinear line is a common tangential line contacting the end boss 97 and the upper boss 93 from a lower side. The reason why the direction along the imaginary rectilinear line connecting the lower surface of the upper boss 93 and the lower surface of the end boss 97 is the mounting direction D is that mounting of the process cartridge B is guided while the process cartridge B is supported at two points consisting of the lower surface of the end boss 97 and the lower surface of the upper boss 93. Incidentally, a direction along an imaginary rectilinear line connecting a lower surface of the end boss 98 and a lower surface of the upper boss 94 may be taken as the mounting direction.

After the process cartridge B is mounted in the printer main body A, the toner cartridge C is mounted into the printer main body A. As shown in part (b) of FIG. 11 and part (b) of FIG. 12, the portions-to-be-guided 50*b* and 60*b* of the toner cartridge C are placed on the guiding portions 108 and 109 of the printer main body A, respectively, and are inserted in the mounting direction D. The direction in which the toner cartridge C is moved along the guiding portions 108 and 109 is a mounting direction of the toner cartridge C.

Part (c) of FIG. 12 shows a state in which the toner cartridge C is mounted to an insertion completion position. In this state, the positioning bosses 50*a* and 60*a* (parts (a) and (b) of FIG. 13) of the toner cartridge C enter the toner container positioning portions 21*a* and 21*b* (part (b) of FIG. 9) of the process cartridge B, respectively. In this state, leading end portions of the portions-to-be-guided 50*b* and 60*b* with respect to the mounting direction are separated from the guiding portions 108 and 109, and trailing end portions of the portions-to-be-guided 50*b* and 60*b* with respect to the mounting direction contact the guiding portions 108 and 109. By this, the toner cartridge C is positioned to the process cartridge B. Further, the trailing ends of the portions-to-be-guided 50*b* and 60*b* contact the guiding portions 108 and 109, so that a position of the toner cartridge C in the printer main body A is determined.

When the openable door 107 is closed after the process cartridge B and the toner cartridge C are mounted, the printer 1 is in a state in which image formation is capable of being executed.

When the toner cartridge C and the process cartridge B are demounted (removed), the procedure is performed in a reverse order to the above-described order. That is, after the openable door 107 is opened, it is only required that first, the toner cartridge C is pulled out in a direction opposite to the mounting direction D and then the process cartridge B is pulled out in the direction opposite to the mounting direction D.

<Residual Amount Detecting Means>

A constitution of a remaining amount detecting means for detecting a remaining toner amount (remaining amount of the developer) in the developing unit 15 will be described. In this embodiment, a light transmission detecting mechanism is used as a remaining amount detecting means.

Part (a) of FIG. 14 is a perspective view showing a part of the developing unit 15, and part (b) of FIG. 14 is an enlarged view a part (range of X1) thereof. FIG. 15 is an exploded view showing a state in which constitution elements (a light guide 410 and a light guide cover 420) of the light transmission detecting mechanism are demounted from the developing unit 15.

As shown in parts (a) and (b) of FIG. 14, the developing unit 15 includes the light guide 410 as a light guiding means and the light guide cover 420 partially covering the light guide 410. The light guide 410 is formed with a light guiding member (light transmitting member) through which detection light used for detecting a remaining toner amount passes.

Further, as shown in FIG. 15, the developing frame 415 which is a container (developing container) forming the developer accommodating chamber 152 of the developing unit 15 is provided with a remaining amount detecting opening 416. The light guide 410 is mounted to the developing frame 415 so as to close the remaining amount detecting opening 416. That is, a part of the light guide 410 is exposed to an inside space (developer accommodating chamber 152) of the developing frame 415 through the remaining amount detecting opening 416. Incidentally, a longitudinal position of the remaining amount detecting opening 416 is shown in FIG. 2. In FIG. 2, the light guide 410 is omitted.

As shown in part (a) of FIG. 14, the light guide 410 includes a detection light incident surface 410*a*, an inside emergent surface 410*b*, an inside incident surface 410*c*, and a detection light emergent surface 410*d*. The detection light incident surface 410*a* and the detection light emergent surface 410*d* are provided outside the developing frame 415 (container). The inside emergent surface 410*b* and the inside incident surface 410*c* are provided inside the developing frame 415 (container). The detection light incident surface 410*a* and the detection light emergent surface 410*d* may be formed in a planar shape (for example, a planar shape parallel to a mounting surface 451*c* of a sensor substrate 451 described later). Further, one or both of the detection light incident surface 410*a* and the detection light emergent surface 410*d* may be curved in a convex shape in order to enhance parallelism or a light-condensing property.

A portion connecting the detection light incident surface 410*a* and the inside emergent surface 410*b* of the light guide 410 constitute an input-side light guiding portion 411 for guiding detection light entering the detection light incident surface 410*a* to the developer accommodating chamber 152 inside the developing frame 415. The inside emergent surface 410*b* and the inside incident surface 410*c* oppose each other in the developer accommodating chamber 152 and form a spatial optical path crossing a part of a space in which the developer is accommodated. A portion connecting the inside incident surface 410*c* and the detection light emergent surface 410*d* of the light guide 410 constitute an output-side light guiding portion 412 for guiding the detection light, entering the inside incident surface 410*c* from the spatial optical path of the developer accommodating chamber 152, to an outside of the developing frame 415.

The detection light incident surface 410*a* and the detection light emergent surface 410*d* are disposed so that as to oppose the light emitting element and the light receiving element of the printer main body A, respectively, in a state in which the process cartridge B is mounted in the printer main body A. Accordingly, the light guide 410 forms an optical path along which light emitted by the light emitting element outside the container passes through an inside space of the container and reaches the light receiving element outside the container.

That is, shown in part (a) of FIG. 14, the light emitted by the light emitting element of the printer main body A travels in an arrow L1 direction and enters the detection light incident surface 410*a* of the light guide 410, and then travels the inside of the input-side light guiding portion 411 (arrow L2). Then, the detection light is emerged from the inside emergent surface 410*b* inside the developing frame 415 and crosses the spatial optical path of the developer accommodating chamber 152, and then enters the inside incident surface 410*c* (arrow L3). Then, the detection light travels the inside of the output-side light guiding portion 412 (arrow L4), and is entered from the detection light emergent surface 410*d* toward the light receiving element on the outside of the developing frame 415 (arrow L5).

Of the above-described optical path, the spatial optical path of the developer accommodating chamber 152 is blocked by the toner stirred by the stirring member 154 (FIGS. 3 to 5) disposed in the developer accommodating chamber 152. Accordingly, the controller of the printer main body A acquires a detection signal of the light receiving element while causing the light emitting element to emit light and measures a length of a time in which the detection light is blocked, so that the controller is capable of estimating a toner amount in the developer accommodating chamber 152.

<Shape of Light Guide>

A detailed shape of the light guide 410 in this embodiment will be described. The input-side light guiding portion 411 includes an incident portion 411*a* (part (b) of FIG. 14, part (b) of FIG. 17), an intermediary emergent portion 411*c* having the inside emergent surface 410*b*, and a connecting portion 411*b* (part (a) of FIG. 14) connecting the incident portion 411*a* and the intermediary emergent portion 411*c*. The incident portion 411*a* is formed in a cylindrical shape which is an example of a columnar shape. A direction (first direction) of a center axis of the cylindrical shape of the incident portion 411*a* is substantially parallel to an optical axis direction (arrow L1) of the light emitting element except for an unavoidable difference such as a shape tolerance during manufacturing of the incident portion 411*a*, an inclination tolerance during mounting of the light emitting element, or the like. The connecting portion 411*b* is bent substantially perpendicular to the incident portion 411*a* and is extended in the longitudinal direction (arrow Z) of the process cartridge B. The intermediary emergent portion 411*c* is bent substantially perpendicular to the connecting portion 411*b*.

The output-side light guiding portion 412 includes an emergent portion 412*a* (part (b) of FIG. 14, part (b) of FIG. 17), an intermediary incident portion 412*c* having the inside incident surface 410*c*, and a connecting portion 412*b* (part (a) of FIG. 14) connecting the emergent portion 412*a* and the intermediary incident portion 412*c*. The emergent portion 412*a* is formed in a prism shape. A direction (first direction) of a center axis of the prism shape of the emergent portion 412*a* is substantially parallel to an optical axis direction (arrow L1). The connecting portion 412*b* is bent substantially perpendicular to the emergent portion 412*a* and is extended in the longitudinal direction (arrow Z) of the process cartridge B. The intermediary incident portion 412*c* is bent substantially perpendicular to the connecting portion 412*b*.

Thus, in this embodiment, the detection light incident surface 410*a* and the detection light emergent surface 410*d* of the light guide 410 and the spatial optical path in the developer accommodating chamber 152 are disposed in positions spaced in the longitudinal direction (arrow Z) of the process cartridge B. Each of the input-side light guiding portion 411 and the output-side light guiding portion 412 of the light guide 410 includes a plurality of bent portions. However, as described below, the light guide cover 420 is provided with a constitution capable of reducing stray light, so that even in the case where an optical path length of the light guide 410 is long or in the case where the optical path of the light guide 410 includes a plurality of bent portions, it becomes possible to detect a remaining toner amount with high detection accuracy. That is, the following constitution of the light guide cover 420 enables that a degree of freedom of the arrangement is improved while maintaining detection accuracy of the remaining amount detecting means.

Incidentally, in this embodiment, the input-side light guiding portion 411 and the output-side light guiding portion 412 are integrally molded by a transparent resin material, but these members 411 and 412 may be separate members. Further, the shape of the light guide 410 is capable of being appropriately changed. For example, the incident portion 411*a* of the input-side light guiding portion 411 may be formed in a columnar shape (for example, the prism shape) other than the cylindrical shape. In the case of the incident portion 411*a* having the columnar shape other than the cylindrical shape, a center line of the incident portion 411*a* means an imaginary rectilinear line which extends in parallel to a height direction of the columnar shape and which passes through a face center of the detection light incident surface 410*a* as viewed in the height direction. Further, the incident portion 411*a* having the columnar shape may also be provided with a slight inclination at a side surface thereof in consideration of a die releasing property during resin molding so that a cross-sectional area of a cross section perpendicular to the height direction becomes smaller as the cross section approaches the detection light incident surface 410*a*, for example.

<Constitution of Printer Main Body>

Next, a constitution of the printer main body A will be described using parts (a) and (b) of FIG. 14, FIG. 16, and parts (a) and (b) of FIG. 17. FIG. 16 is a top (plan) view showing a part of the printer main body A and the process cartridge B mounted in the printer main body A. Part (a) of FIG. 17 is a sectional view in which a part of the printer main body A and the process cartridge B mounted in the printer main body A is cut along the imaginary rectilinear line (z1-Z1 line of FIG. 16) perpendicular to the longitudinal direction (arrow Z). Part (b) of FIG. 17 is an enlarged view showing a part (range of X2) of part (a) of FIG. 17 in an enlarged manner.

As shown in parts (a) and (b) of FIG. 17, the printer main body A is provided with a sensor unit 450. The sensor unit 450 constitutes the light transmission detecting mechanism which is the remaining amount detecting means in this embodiment, in combination with the light guide 410 and the light guide cover 420 of the process cartridge B.

The sensor unit 450 (optical unit) includes a sensor substrate 451, and an LED 451*a* as the light emitting element and a phototransistor 451*b* as the light receiving element, which are mounted on a mounting surface of the sensor substrate 451. The detection light emitted by the LED 451*a* is guided by the light guide 410 having the above-described constitution and then reaches the phototransistor 451*b* along the spatial optical path in the developer accommodating chamber 152 of the developing unit 15. The detection light is then converted into an electric signal by the phototransistor 451*b*.

Further, the sensor unit 450 includes a substrate holder 452 for holding the sensor substrate 451, and a supporting member 453 for movably supporting the substrate holder 452. The supporting member 453 is fixed to the frame of the printer main body A, whereas the sensor substrate 451 and the substrate holder 452 move with mounting and demounting of the process cartridge B. Movement of the sensor substrate 451 and the substrate holder 452 will be described later.

The sensor unit 450 is provided above the photosensitive drum 11 and at an end portion of the process cartridge B with respect to the longitudinal direction on a non-driving side. In addition, the detection light incident surface 410*a* and the detection light emergent surface 410*d* of the light guide 410 opposing the light emitting element and the light receiving element of the sensor unit 450 are provided above the photosensitive drum 11 and at the end portion of the process cartridge B with respect to the longitudinal direction on the non-driving side. Further, entirety of the light guide 410 is disposed above the photosensitive drum 11 and extends from the detection light incident surface 410*a* and the detection light emergent surface 410*d* toward a central side of the process cartridge B with respect to the longitudinal direction.

Here, in a side surface portion of the process cartridge B on the driving side, a drive train is provided for inputting drive from the printer main body A to the process cartridge B and for distributing and transmitting the inputted drive to respective portions of the process cartridge B. In this embodiment, constitution elements of the remaining amount detecting means are disposed above the photosensitive drum 11, so that an arrangement space for gears and the like constituting the drive train is easily ensured.

FIG. 23 is a perspective view showing the drive train of the process cartridge B. Incidentally, for explanation, the side cover 7 and the bearing member 5 of the process cartridge B will be omitted from illustration. The process cartridge B includes a developing coupling 155 as an input member to which a driving force is inputted from the printer main body A. The developing coupling 155 is provided on the swing axis of the developing unit 15. As shown in parts (a) and (b) of FIG. 10 and FIG. 23, the drive inputted to the developing coupling 155 is distributed and transmitted to objects-to-be-driven in the respective units (10, 15) through drive trains 601 and 601*a* for the cleaning unit 10 and a drive train 602 for the developing unit 15. Examples of the objects-to-be-driven includes the developing roller 16, the supplying roller 13, the stirring member 154, and a screw of the receiving chamber 153 of the developing unit 15, and the photosensitive drum 11, the screws 71 and 75 for conveying the residual toner of the cleaning unit 10, and the like.

Further, the side surface portion of the process cartridge B on the non-driving side is provided with contact points (contacts) for applying bias voltages for carrying out an electrophotographic process (FIG. 21). Further, in a space of the printer main body A on the non-driving side relative to the process cartridge B, contacts and a circuit substrate (board) for applying bias voltages to the contacts of the process cartridge B, and a control substrate (board) as a controller for controlling various actuators provided in the printer main body A are disposed. In this embodiment, the constitution elements of the remaining amount detecting means are disposed in a space above the photosensitive drum 11, so that an arrangement space for electrical equipment members such as the contacts, the circuit substrate, the control substrate, and the like is easily ensured.

Incidentally, the contacts for applying the bias voltages for carrying out the electrophotographic process are, for example, contacts E1 to E3 of the developing unit 15 shown in FIG. 21. The contact E1 is connected to a contact E4 (part (a) of FIG. 11) of the printer main body A, and thus enables voltage application to the developing roller 16. The contact E2 is connected to a contact E5 (part (a) of FIG. 11) of the printer main body A, and thus enables voltage application to the supplying roller 13. The contact E3 is connected to a contact E6 (part (a) of FIG. 11) of the printer main body A, and thus enables voltage application to the developing blade 18.

Thus, in this embodiment, in the space above the photosensitive drum 11, the sensor unit 450 and the light guide 410 which constitute the remaining amount detecting means are disposed, so that spaces on opposite sides of the process cartridge B with respect to the longitudinal direction are readily utilized for another purpose. By this, for example, compared with the case where the sensor unit 450 is disposed in a position opposing the side surface portion of the process cartridge B on the driving side or the non-driving side, a volume of the printer main body A can be efficiently used, so that entirety of the printer 1 can be downsized.

<Light Guide Cover>

Next, the light guide cover 420 which is a cover member in this embodiment will be described. As shown in FIG. 15, the light guide cover 420 is mounted to the developing unit 15.

As shown in parts (a) and (b) of FIG. 14 and parts (a) and (b) of FIG. 17, the light guide cover 420 includes a first hole portion 420*a* which is engaged with the input-side light guiding portion 411 and through which the detection light incident surface 410*a* is exposed and includes a second hole portion 420*b* which is engaged with the output-side light guiding portion 412 and through which the detection light emergent surface 410*d* is exposed. That is, the light guide cover 420 includes the first hole portion 420*a* as a first opening through which the incident surface of the guiding means is exposed and the second hole portion 420*b* as a second opening through which the emergent surface of the guiding means is exposed. In a mounting state of the process cartridge B, a surface of the light guide cover 420 on the sensor substrate 451 side is an outer surface of the light guide cover 420. A back-side surface (surface opposing the developing frame 415) of the light guide cover 420 opposite from the outer surface of the light guide cover 420 is an inner surface.

Further, the light guide cover 420 is disposed so as to cover a part of a surface of the light guide 410 other than the detection light incident surface 410*a* and the detection light emergent surface 410*d* as viewed from the sensor substrate 451 side. Specifically, the light guide cover 420 not only covers a part of the incident portion 411*a* by a peripheral wall of the first hole portion 420*a*, but also covers a part of the emergent portion 412*a* of the output-side light guiding portion 412, by a peripheral wall of the first second hole portion 420*a*. Incidentally, the light guide cover 420 may be formed so as to cover a whole surface of the light guide 410 other than the detection light incident surface 410*a* and the detection light emergent surface 410*d* as viewed from the sensor substrate 451 side.

The light guide cover 420 protects the detection light incident surface 410*a* and the detection light emergent surface 410*d* which are surfaces where the light guide 410 makes input and output of the detection light between itself and the sensor substrate 451. Further, the light guide cover 420 reduces erroneous detection of the remaining toner amount by light entering the light guide 410 through a surface other than the detection light incident surface 410*a* and light emerged from a surface other than the detection light emergent surface 410*d*, and thus contributes to improvement in detection accuracy.

Further, in this embodiment, in the constitution in which the sensor unit 450 is disposed above the photosensitive drum 11, the light guide cover 420 is positioned below the sensor unit 450. By this, it is possible to prevent exposure of the surface of the photosensitive drum 11 with light due to leakage of the light of the LED 451*a*. For example, in a constitution in which the LED 451*a* overlaps with the photosensitive drum 11 as viewed in a vertical direction (part (a) of FIG. 17), a part of the light guide cover 420 may preferably exist in a position between the LED 451*a* and the photosensitive drum 11 with respect to the vertical direction and where the part of the light guide cover 420 overlaps with the LED 451*a* as viewed in the vertical direction.

Further, as described later, the light guide cover 420 contacts the sensor unit 450 of the printer main body A during the mounting of the process cartridge B, and thus performs positioning of the detection light incident surface 410*a* and the detection light emergent surface 410*d* relative to the sensor substrate 451. That is, the first hole portion 420*a* and the second hole portion 420*b* have a function of positioning of the detection light incident surface 410*a* and the detection light emergent surface 410*d*.

<Recessed Portion of Light Guide Cover>

As described above, in this embodiment, by providing the light guide cover 420, there are advantages such as the protection of the light guide 410, the improvement in detection accuracy of the remaining toner amount, the prevention of exposure of the photosensitive drum 11 to light, and the like, while there is also a possibility that the light guide cover causes the erroneous detection. That is, when the light guide cover 420 exists in the neighborhood of the light emitting element, there is a possibility that the detection light reflected by the surface of the light guide cover 420 itself reaches the light receiving element without passing through the light guide 410.

More specifically, as shown in part (b) of FIG. 17, the detection light emerged from the LED 451*a* is emitted with a spatial exposure (directional angle) having an optical axis (arrow L1) as a center. In order to take the light in the light guide 410 as much as possible, it is desirable that the detection light incident surface 410*a* is disposed in a position close to the LED 451*a*. However, when operations of mounting and demounting of the process cartridge B and contact and separation of the developing unit 15 are taken into consideration, it is desirable that the detection light incident surface 410*a* is disposed with a certain distance from the LED 451*a*. In that case, there is a possibility that a part of the detection light is reflected by the light guide cover 420 and reaches the phototransistor 451*b*, as light which does not contribute to the remaining toner amount detection without passing through the light guide 410 (i.e., the stray light) and thus the erroneous detection of the remaining toner amount or a lowering in detection accuracy is caused.

Therefore, in this embodiment, a constitution in which a travelling direction of the stray light which did not enter the detection light incident surface 410*a* is controlled was employed.

Specifically, as shown in part (b) of FIG. 14, part (b) of FIG. 17, and FIG. 18, on the outer surface of the light guide cover 420, a recessed portion 425 is formed between the first hole portion 420*a* and the second hole portion 420*b*. FIG. 18 is an enlarged view showing a part of part (b) of FIG. 17 in a further enlarged manner in order to illustrate the shape of the light guide cover 420. The recessed portion 425 has a recessed shape such that in a cross section of part (b) of FIG. 17 and FIG. 18, a part of a surface (outer surface) of the light guide cover 420 on an upstream side in a first direction D1 is recessed on a downstream side of the first direction D1 between the incident portion 411*a* and the emergent portion 412*a* in a second direction D2.

Here, part (b) of FIG. 17 and FIG. 18 show the cross section of a device by an imaginary rectilinear plane which extends in the first direction D1 and the second direction D2 and which passes through the incident portion 411*a* and the emergent portion 412*a*. That is, when a direction crossing both of the first direction D1 and the second direction D2 is a third direction, part (b) of FIG. 17 and FIG. 18 show a cross section perpendicular to the third direction (which is the same as the longitudinal direction (arrow Z) of the process cartridge B in this embodiment).

The first direction D1 is a direction along a center line of the incident portion 411*a* which has the columnar shape and directs from an outer surface side toward an inner surface side of the light guide cover 420. The first direction D1 can also be paraphrased as a direction in which the detection light travels the inside of the incident portion 411*a*, i.e., an optical axis direction in the incident portion 411*a*. Further, the second direction D2 is a direction crossing the first direction and in which the incident portion 411a and the emergent portion 412a are arranged. Incidentally, the first direction D1 is substantially the same direction as a normal direction to a mounting surface of the sensor substrate 451 on which the LED 451a is mounted.

A bottom 425c of the recessed portion 425 is inclined so that a distance thereof from the sensor substrate 451 becomes shorter from the incident portion 411a side toward the emergent portion 412a side in the second direction D2. In other words, an end portion (first end 425a) of the bottom 425c on the incident portion side is positioned downstream of an end portion (second end 425b) of the bottom 425c on the emergent portion side with respect to the first direction D1.

Further, the bottom 425c of the recessed portion 425 is curved so as to be recessed toward the downstream side of the first direction D1 relative to an imaginary rectilinear line Ln1 connecting the first end 425a and the second end 425b between the first end 425a and the second end 425b.

As described above, in this embodiment, the light guide cover 420 is provided with the recessed portion 425, and the bottom 425c thereof is inclined and curved. By this constitution, as shown in FIG. 18, in the case where a part of light emitted from the LED 451a in a position opposing the incident portion 411a with respect to the first direction D1 is incident on the recessed portion 425, the light is reflected roughly toward the LED 451a by the bottom 425c of the recessed portion 425. That is, a travelling direction of the stray light can be controlled so that the stray light entering the recessed portion 425a from the LED 451a is reflected toward the LED 451a side. By this, the stray light is reflected by the light guide cover 420, so that an amount of the stray light reaching the phototransistor 451b can be reduced.

A cross-sectional shape of the bottom 425c of the recessed portion 425 (FIG. 18) is suitable when the shape is an arcuate shape (chain line) such that a point C1 positioned in a region in which the detection light incident surface 410a is projected in the first direction D1 is a center. By this, in the case where the LED 451a is disposed in the neighborhood of this point C1, a direction in which the bottom 425c reflects the light from the LED 451a concentrates at the neighborhood of the LED 451a, so that the travelling direction of the stray light can be controlled more effectively. Incidentally, it is more preferable that the LED 451a is positioned at a center of an arc drawn by the bottom 425c.

A three-dimensional shape of the bottom 425c of the recessed portion 425 is suitable when the shape is a spherical shape such that a point C1 positioned in a region in which the detection light incident surface 410a is projected in the first direction D1 is a center. By this, in the case where the LED 451a is disposed in the neighborhood of this point C1, a direction in which the bottom 425c reflects the light from the LED 451a concentrates at the neighborhood of the LED 451a, so that the travelling direction of the stray light can be controlled more effectively. Incidentally, it is more preferable that the LED 451a is positioned at a center of a sphere drawn by the bottom 425c.

Thus, according to this embodiment, it is possible to reduce the erroneous detection of the remaining toner amount and the lowering in detection accuracy due to the stray light reflected by the light guide cover 420.

Further, the light guide cover 420 can be disposed close to the sensor substrate 451 without actualizing the influence of the stray light reflected by the light guide cover 420, so that various advantages can be obtained.

For example, the detection light toward the photosensitive drum 11 can be blocked effectively by the light guide cover 420, and the sensor substrate 451 can be disposed in the neighborhood of the photosensitive drum 11, so that a degree of freedom of arrangement is improved. The influence of the stray light is not readily exerted even when the light emitting element and the light receiving element are disposed close to each other on the sensor substrate 451.

Incidentally, the input side and the output side of the light guide 410 can be changed to each other, and therefore, the arrangement of the LED 451a and the arrangement of the phototransistor 451b on the sensor substrate 451 may be changed to each other. In that case, the recessed portion 425 may only be required to be formed in a reversed shape with respect to the second direction D2.

<Positioning Constitution During Mounting of Cartridge>

A constitution in which a relative position of the detection light incident surface 410a and the detection light emergent surface 410d on the cartridge side with the LED 451a and the phototransistor 451 on the printer main body side is determined during the mounting of the process cartridge B will be described using FIG. 16 and parts (a) and (b) of FIG. 19.

Parts (a) and (b) of FIG. 19 are schematic views in which the neighborhood of the sensor unit 450 of FIG. 16 is viewed from a lower side of the light guide cover 420 (viewed in an arrow D9 direction of part (b) of FIG. 17). Part (a) of FIG. 19 shows a state during the mounting of the process cartridge B, and part (b) of FIG. 19 shows a state after the mounting of the process cartridge B. Further, in parts (a) and (b) of FIG. 19, the light guide 410 is omitted from illustration.

As shown in FIG. 16, the substrate holder 452 holding the sensor substrate 451 is urged in an arrow H direction by a tension spring 454 as an urging means. The tension spring 454 is stretched between the substrate holder 452 and the supporting member 453. An urging direction (arrow H) of the tension spring 454 is a direction obliquely crossing the mounting direction D of the process cartridge B and includes a component opposite to the mounting direction D.

As shown in part (a) of FIG. 19, the substrate holder 452 includes a first portion-to-be-contacted 452a to which a first contact portion 420d of the light guide cover 420 is contacted and a second portion-to-be-contacted 452b to which a second contact portion 420c of the light guide cover 420 is contacted. The first contact portion 420d and the first portion-to-be-contacted 452a perform positioning of the substrate holder 452 and the light guide cover 420 with respect to the mounting direction D. The second contact portion 420c and the second portion-to-be-contacted 452b perform positioning of the substrate holder 452 and the light guide cover 420 with respect to a direction (longitudinal direction) perpendicular to the mounting direction D.

Further, the substrate holder 452 has an inclined surface 452s for guiding the first contact portion 420d and the second contact portion 420c to the first portion-to-be-contacted 452a and the second portion-to-be-contacted 452b in contact with a third contact portion 420t of the light guide cover 420.

As shown in part (a) of FIG. 19, before the process cartridge B is mounted and before the light guide cover 420 is contacted to the substrate holder 452 during the mounting, the substrate holder 452 is positioned by an urging force of the tension spring 454. A position of the substrate holder 452 in this case partially overlaps with a position of the light guide cover 420 after the process cartridge B is mounted.

Further, the supporting member 453 supporting the substrate holder 452 is provided with covering portions 453a and 453*b* for covering the LED 451*a* and the phototransistor 451*b* during the mounting of the process cartridge B.

When the process cartridge B is inserted in the mounting direction D from the state of part (a) of FIG. 19, the third contact portion 420*t* of the light guide cover 420 contacts the inclined surface 452*s* of the substrate holder 452. Then, the inclined surface 452*s* is pressed, so that the substrate holder 452 slides in an arrow H1 direction against the urging force of the tension spring 454, and the second contact portion 420*c* of the light guide cover 420 contacts the second portion-to-be-contacted 452*b* of the substrate holder 452.

When the process cartridge B is further inserted in the mounting direction D, the first contact portion 420*d* of the light guide cover 420 contacts the first portion-to-be-contacted 452*a* of the substrate holder 452, so that the substrate holder 452 slides in an arrow H2 direction against the urging force of the tension spring 454.

Then, when the process cartridge B is inserted to a predetermined mounting position (position where image formation is capable of being executed), as shown in part (b) of FIG. 19, the substrate holder 452 is positioned in a position to which the substrate holder 452 is moved from an original position in the arrow H1 and H2 directions. In this state, the first contact portion 420*d* and the second contact portion 420*c* contact the first portion-to-be-contacted 452*a* and the second portion-to-be-contacted 452*b*, respectively, so that the light guide cover 420 holds the substrate holder 452 against the urging force of the tension spring 454.

In a positioning state of part (b) of FIG. 19, by movement of the sensor substrate 451 together with the substrate holder 452 from a state of part (a) of FIG. 19, the LED 451*a* and the phototransistor 451*b* are exposed from covering portions 453*a* and 453*b* of the supporting portion 453. Then, the first hole portion 420*a* of the light guide cover 420 opposes the LED 451*a*, and the second hole portion 420*b* of the light guide cover 420 opposes the phototransistor 451*b*. That is, the detection light incident surface 410*a* of the light guide 410 opposes the LED 451*a*, and the detection light emergent surface 410*d* of the light guide 410 opposes the phototransistor 451*b*.

Incidentally, as shown in part (b) of FIG. 17, in a state after the mounting of the process cartridge B, the covering portion 453*a* of the supporting member 453 is positioned between the LED 451*a* and the phototransistor 451*b* with respect to the second direction D2. Further, the covering portion 453*a* is positioned between the sensor substrate 451 and the substrate holder 452, and the light guide cover 420 with respect to the first direction D1. For that reason, the covering portion 453*a* can further reduce a possibility that the light emitted by the LED 451*a* is reflected by the light guide cover 420 and the substrate holder 452 and reaches the phototransistor 451*b*, as the stray light.

Thus, the light guide cover 420 contacts the substrate holder 452 and thus moves the substrate holder 452 during the mounting of the cartridge, so that the light guide 410 and the sensor substrate 451 are positioned. By this, each of a relative position between the detection light incident surface 410*a* and the LED 451*a* and a relative position between the detection light emergent surface 410*d* and the phototransistor 451*b* can be determined with high accuracy, so that detection accuracy of the remaining toner amount can be enhanced.

As described above, the light guide cover 420 not only has a function of protecting the light guide 410 and shielding the detection light so as not to be leaked to the photosensitive drum 11 but also has a function of positioning the light guide 410 and the substrate holder 452.

Incidentally, as shown in part (b) of FIG. 17 and FIG. 18, the substrate holder 452 is provided with a restricting hole 452*c* for restricting the light emitted by the LED 451*a*. By this restricting hole 452*c*, even in the case where a directional angle of the LED 451*a* is wide, it is possible to restrict a light radiation direction, so that a lowering in detection accuracy due to the stray light and leakage of the light to the photosensitive drum 11 can be reduced.

Further, the light guide cover 420 is provided with a projected portion 426 projected toward the sensor substrate 451 side between the recessed portion 425 and the detection light emergent surface 410*d*. The projected portion 426 is formed so as to cross an imaginary rectilinear line Ln2 connecting the LED 451*a* and an opening edge of the restricting hole 452*c*. By providing such a projected portion 426, it is possible to reduce a possibility that the light reflected by a surface at a periphery of the detection light emergent surface 410*d* of the light guide cover 420 reaches the phototransistor 451*b*.

<Positional Relationship Between Swing Axis and Light Guide>

Next, a positional relationship between a swing axis in the process cartridge B with the incident portion 411*a* and the emergent portion 412*a* of the light guide 410 will be described.

FIG. 21 is a side view of the process cartridge B as viewed in the longitudinal direction (rotational axis direction of the photosensitive drum 11). As described above, the developing unit 15 is swingable around a swing axis 8 between a contact position (part (a) of FIG. 20) where the developing roller 16 contacts the photosensitive drum 11 and a separated position (part (b) of FIG. 20) where the developing roller 16 is separated from the photosensitive drum 11. The process cartridge B in FIG. 21 is in a state (development contact state) in which the developing roller 16 is in the contact position.

As shown in FIG. 21, as viewed in the longitudinal direction, with respect to an imaginary rectilinear line Ln3 passing through the swing axis 8 and drawn in the first direction D1, the incident portion 411*a* is disposed on one side of the second direction D2 and the emergent portion 412*a* is disposed on the other side of the second direction D2. That is, as viewed in the longitudinal direction, when two areas divided by the imaginary rectilinear line Ln3 are a first area Ar1 and a second area Ar2, the incident portion 411*a* is disposed in the first area Ar1 and the emergent portion 412*a* is disposed in the second area Ar2.

Here, the first direction D1 is a direction which is a direction of a center line of the incident portion 411*a* having the columnar shape and which directs from an outside toward an inside of the light guide 410 through the incident portion 411*a*. Further, the first direction D1 can also be said as a direction which is a direction of an optical axis of the incident portion 411*a* and which directs from the outside toward the inside of the light guide 410. Further, the second direction D2 is a direction which crosses the first direction D1 and in which the incident portion 411*a* and the emergent portion 412*a* are arranged. Incidentally, in this embodiment, the first direction D1 is substantially the same direction as a normal direction to the mounting surface 451*c* of the sensor substrate 451, and the second direction D2 is a direction substantially parallel to the mounting surface 451*c* of the sensor substrate 451.

An advantage of this constitution will be described using parts (a) and (b) of FIG. 22. Part (a) of FIG. 22 is a schematic view showing an arrangement of the swing axis 8, the incident portion 411*a*, and the emergent portion 412*a* in this embodiment. Part (b) of FIG. 22 is a schematic view showing an arrangement of a swing axis 8, an incident portion 411*a*, and an emergent portion 412*a* in a comparison example.

In this embodiment (part (a) of FIG. 22), with respect to the imaginary rectilinear line Ln3 passing through the swing axis 8 and drawn in the first direction D1, the incident portion 411*a* and the emergent portion 412*a* are disposed on one side and the other side, respectively, of the second direction D2. On the other hand, in the comparison example (part (b) of FIG. 22), with respect to the imaginary rectilinear line Ln3, both the incident portion 411*a* and the emergent portion 412*a* are disposed only on either one (left side of part (b) of FIG. 22 in this case) of opposite sides of the second direction D2.

Here, during execution of the image forming operation, the developing unit 15 is held in the contact position, but due to various factors, an angle of the developing unit 15 about the swing axis 8 fluctuates in some cases. For example, as shown in FIG. 23, the driving force inputted to the developing coupling 155 is distributed to the respective objects-to-be-driven (the developing roller 16 and so on) by the drive train provided at the driving-side end portion of the process cartridge B. At this time, a driving load of the object-to-be-driven is fluctuated depending on the toner amount of the developing unit 15, and angle of rotation of the stirring member 154, and the like. As a result of the fluctuation in load torque when the developing coupling 155 drives the driving train on the developing unit 15 side, the developing unit 15 vibrates about the swing axis 8 with a small fluctuation range in some cases.

In parts (a) and (b) of FIG. 22, a change in position of the light guide 410 in the case where the developing unit 15 vibrates with an angle of Δθ will be described. Between this embodiment and the comparison example, values of Δθ are the same.

In the comparison example (part (b) of FIG. 22), when the developing unit 15 swings in the clockwise direction in the figure with the angle of Δθ, the incident portion 411*a* and the emergent portion 412*a* move from a broken line position to a solid line position. At this time, both the detection light incident surface 410*a* and the detection light emergent surface 410*d* move so as to approach the mounting surface 451*c* of the sensor substrate 451 in the first direction D1. In other words, signs (+ and −) always coincide with each other between a fluctuation amount Δd3 of a distance between the LED 451*a* and the detection light incident surface 410*a* and a fluctuation amount Δd4 of a distance between the phototransistor 451*b* and the detection light emergent surface 410*d*. This is because with respect to the imaginary rectilinear line Ln3 passing through the swing axis 8 and drawn in the first direction D1, both the incident portion 411*a* and the emergent portion 412*a* are disposed on one side of the second direction D2. Incidentally, even in the case where both the incident portion 411*a* and the emergent portion 412*a* are disposed on the other side (right side of part (b) of FIG. 22) with respect to the imaginary rectilinear line Ln3, the signs (+ and −) similarly coincide with each other between the fluctuation amounts Δd3 and Δd4.

That is, in the comparison example, in the case where the vibration of the developing unit 15 occurs, the distance between the LED 451*a* and the detection light incident surface 410*a* and the distance between the phototransistor 451*b* and the detection light emergent surface 410*d* increase or decrease simultaneously. For that reason, a fluctuation in optical path from the LED 451*a* to the phototransistor 451*b* through the light guide 410 and the spatial optical path in the container becomes large. As a result, a change in light quantity of the light reaching the phototransistor 451*b* becomes large, so that there is a possibility that the vibration of the developing unit 15 has the influence on the detection accuracy of the remaining toner amount.

Incidentally, in an air layer between the light guide 410 and the LED 451*a* or the phototransistor 451*b*, the light quantity largely fluctuates depending on the square of the optical path length. Further, in the case where the remaining toner amount is detected on the basis of a detection signal of the phototransistor 451*b*, it is possible to discriminate a length of a time in which the spatial optical path in the container is blocked by the toner through comparison of the detection signal (for example, a voltage value) with a predetermined threshold. For that reason, when the light quantity of the light reaching the phototransistor 451*b* is largely shifted by a change in optical path length, the detection accuracy of the remaining toner amount can lower.

Also, in this embodiment (part (a) of FIG. 22), when the developing unit 15 swings in the clockwise direction in the figure with the angle of Δθ, the incident portion 411*a* and the emergent portion 412*a* of the light guide 410 move from the broken line position to the solid line position. At this time, the detection light incident surface 410*a* approaches the mounting surface 451*c* of the sensor substrate 451 in the first direction D1, while the detection light emergent surface 410*d* moves away from the mounting surface 451*c* of the sensor substrate 451 in the first direction D1. In other words, the signs (+ and −) are opposite to each other between a fluctuation amount Δd1 of a distance between the LED 451*a* and the detection light incident surface 410*a* and a fluctuation amount Δd2 of a distance between the phototransistor 451*b* and the detection light emergent surface 410*d*. This is because with respect to the imaginary rectilinear line Ln3 passing through the swing axis 8 and drawn in the first direction D1, the incident portion 411*a* and the emergent portion 412*a* are disposed separately on one end side and the other end side, respectively, of the second direction D2.

That is, in this embodiment, even when the vibration of the developing unit 15 occurs, the increase or decrease of the distance between the LED 451*a* and the detection light incident surface 410*a* and the increase or decrease of the distance between the phototransistor 451*b* and the detection light emergent surface 410*d* cancel each other. For that reason, the fluctuation in optical path length from the LED 451*a* to the phototransistor 451*b* through the light guide 410 and the spatial optical path in the container is reduced. By this, the influence of the vibration of the developing unit 15 is reduced, so that the detection accuracy of the remaining toner amount can be improved.

Further, in part (a) of FIG. 22, a distance from the swing axis 8 to a center of the detection light incident surface 410*a* is taken as R1, and a distance from the swing axis to a center of the detection light emergent surface 410*d* is taken as R2. In part (a) (b) of FIG. 22, a distance from the swing axis 8 to a center of the detection light incident surface 410*a* is taken as R3, and a distance from the swing axis 8 to a center of the detection light emergent surface 410*d* is taken as R4.

At this time, an interval between the incident portion 411*a* and the emergent portion 412*a* (interval between the LED 451*a* and the phototransistor 451*b*) with respect to the second direction D2 is the same between parts (a) and (b) of FIG. 22, at least $R1<R3$ holds. For that reason, a movement amount ΔL3 (nearly equal to $R3 \times \Delta\theta$) of the detection light incident surface 410*a* in the comparison example in which the developing unit 15 vibrates with the angle of Δθ (rad)

becomes larger than a movement amount ΔL1 (nearly equal to R1×Δθ) of the detection light incident surface 410*a* in this embodiment.

Incidentally, in part (b) of FIG. 22, in the case where both the incident portion 411*a* and the emergent portion 412*a* are disposed on the other side (right side in the figure with respect to the imaginary rectilinear line Ln2, at least R2<R4 holds. For that reason, a movement amount ΔL4 (nearly equal to R4×Δθ) of the detection light emergent surface 410*d* in the comparison example in which the developing unit 15 vibrates with the angle of Δθ (rad) becomes larger than a movement amount ΔL2 (nearly equal to R2×Δθ) of the detection light emergent surface 410*d* in this embodiment.

Accordingly, according to this embodiment, the movements amounts ΔL1 and ΔL2 of the detection light incident surface 410*a* and the detection light emergent surface 410*d* due to the vibration of the developing unit 15 can be suppressed to low levels. By this, positions of the detection light incident surface 410*a* and the detection light emergent surface 410*d* relative to the LED 451*a* and the phototransistor 451*b*, respectively, are stabilized, and thus contribute to improvement in detection accuracy.

Further, in this embodiment, by the above-described separating mechanism 100 (see, parts (a) and (b) of FIG. 20), the developing unit 15 is moved between the contact position and the separated position. On the other hand, in this embodiment, the movement amounts (R1×θ, R2×θ) of the detection light incident surface 410*a* and the detection light emergent surface 410*d* relative to a swing angle θ of the developing unit 15 are suppressed to levels lower than levels in the comparison example. Accordingly, a movement space of the light guide 410 with the swing of the developing unit 15 becomes small. That is, the movement space of the light guide 410 can be ensured without upsizing the process cartridge B, and thereby contribute to downsizing of the printer 1.

Incidentally, in this embodiment, the developing coupling 155 which is the drive input portion to the process cartridge B is disposed on the swing axis 8, but even in the case where the drive input portion is provided in a position different from the swing axis 8, the vibration of the developing unit 15 due to the fluctuation in driving load or the like can be occur. Accordingly, the above-described arrangement of the incident portion 411*a* and the emergent portion 412*a* is also applicable to such a case.

Other Embodiments

In the above-described embodiment, the light transmission detecting mechanism as the remaining amount detecting means for the process cartridge B was described, but a similar light transmission detecting mechanism may be used as a means for detecting a toner amount in other cartridges. For example, the light transmission detecting mechanism may also be used as a means for detecting a remaining toner amount of the toner supplying portion 30 of the toner cartridge C in the above-described embodiment or as a means (full-state detecting means) for detecting an amount of the residual toner accommodated in the residual toner collecting portion 40.

Further, in the above-described embodiment, a constitution in which the input side and the output side of the light transmission detecting mechanism are changed to each other may be employed. That is, the arrangements of the LED 451*a* and the phototransistor 451*b* on the sensor substrate 451 may be changed to each other, and the functions of the detection light incident surface 410*a* and the detection light emergent surface 410*d* of the light guide 410 may be changed to each other. In this case, the shape of the incident portion (emergent portion 412*a* in this embodiment) on which the detection light is incident may be kept in the prism shape or may also be changed to the cylindrical shape or another columnar shape. Similarly, the shape of the emergent portion (the incident portion 411*a* in this embodiment) from which the detection light is emerged may be kept in the cylindrical shape or may also be changed to the prism shape or another columnar shape.

Further, in the above-described embodiment, the constitution in which each of the process cartridge B and the toner cartridge C is mounted in the printer main body A was described, but a constitution in which the process cartridge B and the toner cartridge C are integrally assembled into a unit may be employed.

Further, in the above-described embodiment, an example in which the light transmission detecting mechanism is used as the means for detecting the toner amount inside the cartridge mounted in the printer main body was described, but a constitution in which the developing unit is incorporated in the printer main body may be employed.

Further, in the above-described embodiment, the image forming apparatus including a single image bearing member was described, but the present invention is not limited thereto. For example, the present invention is also applicable to a color image forming apparatus which includes a plurality of image bearing members and which forms a color image with a plurality of kinds of developers.

SUMMARY OF THE PRESENT INVENTION

The present invention encompasses at least the following constitutions.

(Constitution 1)

A cartridge comprising:

a first unit including a photosensitive drum rotatable about a rotational axis; and a second unit including a developing roller carrying a developer and configured to supply the developer and a container for accommodating the developer, the second unit being supported by the first unit so as to be swingable about a swing axis extending in a direction of the rotational axis relative to the first unit, wherein the second unit includes a light guide including an incident portion which is for guiding light so as to enter an inside of the container from outside of the cartridge and which has a columnar shape with a center line as a center and including an emergent portion for guiding the light entering the inside of the container through the incident portion and emerging the light to outside of the cartridge, and wherein, when a direction of the center line is a first direction and the cartridge is viewed in the direction of the rotational axis of the photosensitive drum, in a case that two regions (areas) divided by an imaginary rectilinear line passing through the swing axis and extending in the first direction are a first region and a second region, the incident portion is provided in the first region, and the emergent portion is provided in the second region.

(Constitution 2)

A cartridge comprising:

a first unit including a photosensitive drum rotatable about a rotational axis; and a second unit including a developing roller carrying a developer and configured to supply the developer and a container for accommodating the developer, the second unit being supported by the first unit so as to be swingable about a swing axis extending in a direction of the rotational axis relative to the first unit, wherein the second unit includes a light guide including an incident portion which is for guiding light so as to enter an inside of the container from outside of the cartridge and which has a columnar shape with a center line as a center and including an emergent portion for guiding the light entering the inside of the container through the incident portion and emerging the light to outside of the cartridge, and wherein, when a direction of the an optical axis of the incident portion is a first direction and the cartridge is viewed in the direction of the rotational axis of the photosensitive drum, in a case that two regions (areas) divided by an imaginary rectilinear line passing through the swing axis and extending in the first direction are a first region and a second region, the incident portion is provided in the first region, and the emergent portion is provided in the second region.

(Constitution 3)

A cartridge of the constitution 1 or the constitution 2, wherein the second unit includes a portion-to-be-pressed which is pressed by a pressing member outside the cartridge and is configured to be moved by pressing the portion to be pressed from a contact position where the developing roller is contacted to the photosensitive drum to a separated position where the developing roller is separated from the photosensitive drum.

(Constitution 4)

The cartridge which is either one of the constitutions 1, 2, and 3, further comprising an input member configured so that a driving force for rotating the developing roller is inputted from the outside of the cartridge to the cartridge.

(Constitution 5)

An image forming apparatus comprising:

an apparatus main assembly including an optical unit which includes a light emitting element, a light receiving element, and a substrate having a mounting surface on which the light emitting element and the light receiving element are mounted and which is configured so that a detection signal is issued depending on light received by the light receiving element, wherein a normal direction to the mounting surface is the first direction and a direction parallel to the mounting surface is a second direction; and the cartridge which is either one of the constitutions 1 to 4, wherein the cartridge is detachably mountable to the apparatus main assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102264 filed on Jun. 24, 2022, which is hereby incorporated by reference herein in its entirety.

What is claimed is:

1. A cartridge comprising:

a container configured to accommodate developer;

a light guide including an incident portion and an emergent portion, wherein the incident portion has a columnar shape with a center line as a center and guides light so that the light enters from outside of the cartridge into an inside of the container, and wherein the emergent portion guides the light so that the light entered into the inside of the container through the incident portion emerges toward outside of the cartridge; and a cover configured to partially cover the light guide and including an outer surface facing outside of the cartridge, an inner surface on a side opposite from the outer surface, a first opening through which an incident surface of the incident portion is exposed to outside of the cartridge, and a second opening through which an emergent surface of the emergent portion is exposed to outside of the cartridge, wherein, when a direction which is a direction of the center line and which directs from an outer surface side toward an inner surface side of the cover is a first direction, a direction which crosses the first direction and in which the incident portion and the emergent portion are arranged is a second direction, and a direction crossing both the first direction and the second direction is a third direction, in a cross section perpendicular to the third direction:

(i) the outer surface includes a recessed portion recessed toward a downstream side of the first direction between the incident portion and the emergent portion with respect to the second direction, (ii) a first end of a bottom of the recessed portion on an incident portion side with respect to the second direction is positioned on a side downstream with respect to the first direction of a second end of the bottom on an emergent portion side with respect to the second direction, and (iii) the bottom is curved so as to be recessed toward the downstream side of the first direction between the first end and the second end relative to an imaginary rectilinear line connecting the first end and the second end.

2. The cartridge according to claim 1, wherein in the cross section, the bottom of the recessed portion is formed in an arcuate shape, and wherein a center of the bottom formed in the arcuate shape is in a position overlapping with the incident portion as viewed in the first direction.

3. The cartridge according to claim 1, wherein the bottom of the recessed portion is formed in a spherical shape, and wherein a center of the bottom formed in the spherical shape is in a position overlapping with the incident portion as viewed in the first direction.

4. The cartridge according to claim 1, wherein the cover includes a projected portion provided between the second end of the bottom and the emergent surface of the light guide with respect to the second direction, and the projected portion projects to a position that is more upstream in the first direction than the position of the second end.

5. The cartridge according to claim 1, further comprising:

a photosensitive drum; and a developing roller configured to develop an electrostatic latent image into an image on a surface of the photosensitive drum with a developer, wherein the cartridge is detachably mountable to a main assembly of an image forming apparatus, and the main assembly includes a light emitting element configured to emit light toward the incident portion, and wherein, in a case that the cartridge is mounted in the main assembly, the photosensitive drum is provided so as to be positioned below the light emitting element, and at least a part of the cover is provided in a position which is between the light emitting element and the photosensitive drum with respect to a direction of gravitation and which overlaps with the photosensitive drum as viewed from above.

6. The cartridge according to claim 5, wherein the light guide further comprises an inside emergent surface and an inside incident surface which are provided inside the container, wherein the light guide is constituted so as to guide the light so that the light entering the incident surface emerges from the inside emergent surface and enters the inside incident surface through an inside space of the container, and then emerges from the emergent surface of the emergent portion, and wherein the incident portion and the emergent portion are provided at an end portion of the cartridge with respect to a rotational axis direction of the photosensitive drum, and the inside emergent surface and the inside incident surface are provided at positions closer to a center of the cartridge in the rotational axis direction than the incident portion and the emergent portion are to the center of the cartridge.

7. An image forming apparatus comprising:

a main assembly including an optical unit which includes a light emitting element, a light receiving element, and a substrate having a mounting surface on which the light emitting element and the light receiving element are mounted and which is configured to generate a detection signal depending on light received by the light receiving element, wherein a direction normal to the mounting surface is a first direction, and a direction parallel to the mounting surface is a second direction; and a cartridge according to claim 1, wherein the cartridge is detachably mountable to the main assembly.

8. A cartridge comprising:

a container configured to accommodate developer;

a light guide including an incident portion and an emergent portion, wherein the incident portion guides light so that light entering from outside of the cartridge into an inside of the container, and the emergent portion guides the light so that the light entered into the inside of the container through the incident portion emerges toward outside of the cartridge; and a cover configured to partially cover the light guide and including an outer surface facing outside of the cartridge, an inner surface on a side opposite from the outer surface, a first opening through which an incident surface of the incident portion is exposed to outside of the cartridge, and a second opening through which an emergent surface of the emergent portion is exposed to outside of the cartridge, wherein, when a direction which is a direction of an optical axis of the incident portion and which directs from an outer surface side toward an inner surface side of the cover is a first direction, a direction which crosses the first direction and in which the incident portion and the emergent portion are arranged is a second direction, and a direction crossing both the first direction and the second direction is a third direction, in a cross section perpendicular to the third direction, (i) the outer surface includes a recessed portion recessed toward a downstream side of the first direction between the incident portion and the emergent portion with respect to the second direction, (ii) a first end of a bottom of the recessed portion on an incident portion side with respect to the second direction is positioned on a side downstream with respect to the first direction of a second end of the bottom on an emergent portion side with respect to the second direction, and (iii) the bottom is curved so as to be recessed toward the downstream side of the first direction between the first end and the second end relative to an imaginary rectilinear line connecting the first end and the second end.

9. The cartridge according to claim 8, wherein in the cross section, the bottom of the recessed portion is formed in an arcuate shape, and wherein a center of the bottom formed in the arcuate shape is in a position overlapping with the incident portion as viewed in the first direction.

10. The cartridge according to claim 8, wherein the bottom of the recessed portion is formed in a spherical shape, and wherein a center of the bottom formed in the spherical shape is in a position overlapping with the incident portion as viewed in the first direction.

11. The cartridge according to claim 8, wherein the cover includes a projected portion provided between the second end of the bottom and the emergent surface of the light guide with respect to the second direction, and the projected portion projects to a position that is more upstream in the first direction than the position of the second end.

12. The cartridge according to claim 8, further comprising:

a photosensitive drum; and a developing roller configured to develop an electrostatic latent image into an image on a surface of the photosensitive drum with a developer, wherein the cartridge is detachably mountable to a main assembly of an image forming apparatus, and the main assembly includes a light emitting element configured to emit light toward the incident portion, and wherein in a case that the cartridge is mounted in the main assembly, the photosensitive drum is provided so as to be positioned below the light emitting element, and at least a part of the cover is provided in a position which is between the light emitting element and the photosensitive drum with respect to a direction of gravitation and which overlaps with the photosensitive drum as viewed from above.

13. The cartridge according to claim 12, wherein the light guide further comprises an inside emergent surface and an inside incident surface which are provided inside the container, wherein the light guide is constituted so as to guide the light so that the light entering the incident surface is emerges from the inside emergent surface and enters the inside incident surface through an inside space of the container, and then emerges from the emergent surface of the emergent portion, and wherein the incident portion and the emergent portion are provided at an end portion of the cartridge with respect to a rotational axis direction of the photosensitive drum, and the inside emergent surface and the inside incident surface are provided at positions closer to a center of the cartridge in the rotational axis direction than the incident portion and the emergent portion are to the center of the cartridge.

14. An image forming apparatus comprising:

a main assembly including an optical unit which includes a light emitting element, a light receiving element, and a substrate having a mounting surface on which the light emitting element and the light receiving element are mounted and which is configured to generate a detection signal depending on light received by the light receiving element, wherein a direction normal to the mounting surface is a first direction, and a direction parallel to the mounting surface is a second direction; and a cartridge according to claim 8, wherein the cartridge is detachably mountable to the main assembly.

* * * * *